United States Patent
Cahill et al.

(10) Patent No.: US 6,558,762 B2
(45) Date of Patent: *May 6, 2003

(54) ZERO OXYGEN PERMEATION PLASTIC BOTTLE FOR BEER AND OTHER APPLICATIONS

(75) Inventors: Paul J. Cahill, Wheaton, IL (US); George E. Rotter, Naperville, IL (US); Stephen Y. Chen, Wheaton, IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/112,853

(22) Filed: Mar. 28, 2002

(65) Prior Publication Data

US 2002/0155236 A1 Oct. 24, 2002

Related U.S. Application Data

(63) Continuation of application No. 09/254,138, filed as application No. PCT/US97/16711 on Sep. 22, 1997, now Pat. No. 6,365,247, and a continuation-in-part of application No. 08/717,370, filed on Sep. 23, 1996, now Pat. No. 6,083,585

(60) Provisional application No. 60/040,394, filed on Mar. 11, 1997.

(51) Int. Cl.$^7$ .............................................. B29D 22/00
(52) U.S. Cl. ...................................................... 428/35.7
(58) Field of Search ........................................ 428/35.7

(56) References Cited

U.S. PATENT DOCUMENTS

| | | | | |
|---|---|---|---|---|
| 4,393,106 A | * | 7/1983 | Maruhashi | 428/35 |
| 4,705,708 A | * | 11/1987 | Briggs | 428/35 |
| 5,759,653 A | * | 6/1998 | Collette | 428/35.9 |
| 5,843,539 A | * | 12/1998 | Harvey | 428/1 |
| 5,952,066 A | * | 9/1999 | Schmidt | 428/35.9 |
| 6,113,927 A | * | 9/2000 | Hatakeyama | 424/401 |
| 6,194,042 B1 | * | 2/2001 | Finkelstein | 428/36.5 |

* cited by examiner

*Primary Examiner*—Edward J. Cain
(74) *Attorney, Agent, or Firm*—Joseph DiSalvo

(57) ABSTRACT

Multilayered plastic bottles are disclosed having oxygen scavenging capacity sufficient to maintain substantially zero or near zero (depending on product requirements) presence of oxygen in the bottle cavity for the planned shelf life of the bottled product under specified storage conditions. The bottles feature a layer comprised of oxygen scavenger copolyester and may be used for bottling beer and other products requiring nearly total absence of oxygen for the duration of the target product shelf life.

9 Claims, 7 Drawing Sheets

# ZERO OXYGEN PERMEATION PLASTIC BOTTLE FOR BEER AND OTHER APPLICATIONS

CROSS REFERENCE TO RELATED APPLICATIONS

This application is a continuation of U.S. application Ser. No. 09/254,138 filed nationally on Mar. 2, 1999 and now U.S. Pat. No. 6,365,247. U.S. application Ser. No. 09/254,138 was originally POT filed on Sep. 22, 1997 and received PCT Application No. PCT/US97/16711. U.S. application Ser. No. 09/254,138 claims the benefit of U.S. Provisional Application No. 60/040,394 filed on Mar. 11, 1997. Also, U.S. application Ser. No. 09/254,138 is a Continuation in Part of U.S. application Ser. No. 08/717,370 filed on Sep. 23, 1996 and now U.S. Pat. No. 6,083,585.

FIELD OF THE INVENTION

The invention relates to multilayered plastic containers having improved resistance to oxygen permeation and to compositions and processes for production of multilayered plastic bottles.

BACKGROUND OF THE INVENTION

In order to be technically acceptable, beer containers (glass, metal, or plastic) must maintain the beer contained therein in near oxygen free environment. A generally accepted industry standard is considered to be a maximum of 1 ppm oxygen ingress into the bottle over the planned shelf life of the bottled beer. Further, not only must oxygen be excluded from the bottled beer, but the egress of carbon dioxide from the beer out through the bottle walls must also be eliminated or at least contained to defined standards.

Oxygen may be present in bottled beer from at least three separate sources. In some instances, unwanted oxygen (from air) is not completely eliminated from the space above the liquid in the beer bottle during the bottle filling process. Oxygen arising from this source is known as head space oxygen. Even beer packaged in cans is susceptible to the presence of head space oxygen. In conventionally capped glass beer bottles, oxygen may enter the bottle during storage by permeation through the medium used as the gasket in the crimped bottle crown. A third source of oxygen in bottled beer is specific to the use of plastic bottles. Oxygen, from air, has the ability to permeate many conventional bottling polyesters and end up inside the bottle cavity. Also, for plastic bottles, oxygen may be dissolved or adsorbed in the plastic Oxygen dissolved in or adsorbed on the plastic bottle walls may be desorbed and end up in the bottle cavity. Such desorbed oxygen is indistinguishable from head space oxygen once inside the bottle cavity, except that it should be viewed as a possible continuing source of oxygen which must be consumed or depleted. For the purposes hereof desorbed oxygen will be considered to be a factor which contributes to head space oxygen. Oxygen dissolved in the plastic wall is indistinguishable from oxygen attempting to permeate through the plastic bottle walls. For the purposes hereof oxygen dissolved in the plastic bottle walls will be considered the same as oxygen attempting to permeate the bottle walls. In summary, then, beer packaged in metal cans is generally at risk only from head space oxygen. Beer in glass bottles is generally at risk from head space oxygen and also from oxygen permeation through the bottle closure means, especially crimped crown gaskets. Beer in plastic bottles is at oxygen risk from the two sources noted above and also from permeation of oxygen through the bottle wall into the bottle cavity. These considerations also apply to other products packaged in cans and bottles though the effects of oxygen can vary considerably depending on oxygen sensitivity of the product.

While the bottling of beer in plastic bottles is still in its infancy, the above recitation as methods for unwanted oxygen to be present in a plastic bottle cavity are well documented in the art, not only for bottling applications having oxygen requirements as rigorous as those for beer but also for applications less stringent than those for bottling beer. Attempts to overcome these problems for plastic bottles have often involved the use of multilayered bottles where at least one of the layers comprises a polymer (such as ethylene vinyl alcohol copolymer, EVOH) having superior passive resistance to oxygen permeation as compared to the bottling polyester which is usually polyethylene terephthalate (PET). There are disadvantages to such approaches including the following: (1) the bottles are no longer suitable for recycle with other polyester (PET) bottles because of the presence of a second and incompatible polymer (EVOH), (2) the bottles tend to delaminate at the PET/EVOH interfaces, although such delamination may be somewhat diminished (at additional expense) by the use of adhesive tie layers, (3) the differences in melting points and other physical properties between PET and EVOH cause numerous problems in the bottle fabrication-process, and (4) use of a passive oxygen barrier, such as an EVOH layer, tends to keep head space oxygen trapped within the bottle cavity instead of eliminating it.

This invention addresses these and other problems related to prior art efforts to manufacture zero and near zero oxygen permeation plastic bottles.

INVENTION SUMMARY AND PRIOR ART REVIEW

In a broad sense, therefore, this invention relates to novel bottles and a process for the production of multilayered substantially zero oxygen permeation plastic bottles. Substantially zero oxygen permeation means that the oxygen which finds it way to the bottled product is an amount which is only barely measurable with instruments which measure such permeation. In the absence of a specific amount of oxygen, substantially zero oxygen permeation will be considered to be 1 ppm of oxygen, in terms of the weight of the bottled product, for the target shelf life of the bottled product. The multilayered plastic bottles of this invention are suitable for recycle with other polyester bottles, have excellent rigidity, have good clarity when such clarity is desired, resist delamination, do not need tie layers, and also have the ability not only to keep oxygen (from air) from entering the bottle cavity but also have the ability to consume or deplete the presence of unwanted oxygen in the bottle cavity. The novel bottles of this invention involve the use of modern multilayer bottle making processes and equipment in conjunction with deployment of at least one layer (of the multilayered plastic bottle) which comprises a copolyester oxygen scavenging formulation which is an active oxygen scavenger. Active oxygen scavengers consume (or otherwise deplete) oxygen from a given environment. As noted in the co-pending application, a zero oxygen permeation multilayer bottle will have enough oxygen scavenging capacity to consume any unwanted (head space) oxygen in a bottle cavity and still have enough capacity remaining to consume oxygen at the rate at which it reaches the scavenger layer from air external to the container for the necessary shelf life of the filled bottle.

Applicants' oxygen scavenger systems are block copolycondensates comprising predominately polycondensate segments and an oxygen scavenging amount of polyolefin oligomer segments. Predominately means that at least 50 weight % of the copolycondensate may be attributed to polycondensate segments The preferred polycondensate segments, especially for bottling use are polyester segments. For layers in multilayered bottles in which some of the layers are PET or modified polyesters such as PETI, PETN, APET, PETB and/or PEN, segments of the block copolyester comprising these same polyesters are especially preferred. A primary reason is that the copolyesters most closely emulate the polyester from which its polyester segments are derived. The polyesters recited above and the various modified bottling polyesters considered safe for use with food as listed in 21 CFR § 177.1630 are the polyesters of choice for bottles because of their clarity, rigidity, and long history of usage for food and beverage storage. It will be understood that the many references to PET made in this specification shall (unless otherwise indicated) encompass not only PET, but shall also encompass PET as is commonly used in various modified forms for bottling including, but not limited, to the list of modified polyesters recited above and subsequently defined in greater detail in this specification.

The polyolefin oligomer segments are prepared for copolycondensation by first functionalizing the polyolefin oligomer segments with end groups capable of entering into polycondensation reactions. This is an important feature because the polyolefin oligomers are, in effect, addition polymers. Functionalization of the polyolefin oligomers with end groups affords a convenient method for incorporation of addition polymer segments into a copolycondensate. A preferred polyolefin oligomer is polybutadiene (PBD) because it has good oxygen scavenging capacity and reacts quickly with oxygen especially in the presence of a transition metal catalyst, such as cobalt, and in the presence of benzophenone, or both cobalt and benzophenone.

One of the salient features of the oxygen scavenging copolyesters of this invention is their ability to scavenge oxygen in the presence or absence of water or even moisture. While much of the discussion of this disclosure is focused on zero oxygen permeation beer bottles, many other materials are suitable for being bottled and/or packaged in the zero and near zero oxygen permeation packaging environments envisioned and encompassed by this invention. Examples, other than beer, of perishable food and beverages for which a zero oxygen permeation bottle, jar, or specialized container would be desirable are well known and include wines, fruit juices, beverage concentrates, isotonics, flavored teas, tomato based products such as catsup, salsas, and barbecue sauces, vinegar, mayonnaise, baby food, nuts and dry foodstuffs of all varieties. Non-food items requiring zero oxygen permeation packaging would include oxygen sensitive electronic parts.

One reason that the timing of this invention is so appropriate has to do with the recent trend in the food and beverage industries of providing consumer information regarding product freshness. Whether legislated or voluntary, it has become rather standard practice in the food and beverage industries to provide an un-coded, easily understood "sell by", "use by", or "bottled on" date clearly printed on the bottle or package. This long felt need to satisfy consumer awareness of product freshness has recently been very well exemplified by a major USA brewery advertising campaign featuring their so-called "born on" date for bottled beer. These consumer information data on packages and bottles assist consumers in their determination of product suitability and freshness. These data are also of value in the application of this invention since knowledge of the target shelf life for a given product permits easy calculation of oxygen scavenging capacity required to sustain zero (or near zero) oxygen permeation for the maximum planned shelf life.

The adjustment of the oxygen scavenging capacity of the bottles of this invention to ensure zero oxygen permeation vary not only by product but also within a given product line. In a paper entitled REQUIREMENTS FOR PLASTIC BEER PACKAGES presented at the "Future-Pak '96" conference by Dr. Nick J. Huige of the Miller Brewing Company, it was disclosed that for US domestic beers, a maximum ingress of 1000 ppb (1 ppm) over 120 day shelf life when stored at 75° F. (24 °C) was generally recognized as the industry standard. It is a common practice to pull any beer over 120 days old (i.e., 120 days since bottling) from the retailers' shelf and destroy it. This is done for many US beers not only because of the possible presence of oxygen, but also because of other changes which occur once beer is bottled, especially the appearance of a musty or skunky character. Huige also estimates that about 95% of the beer from major US breweries reaches consumers within 60 days of bottling. But in keeping with the industry standard, a planned shelf life of zero oxygen permeation for 120 days at 75° F. is a realistic target for bottling beer from major US breweries.

For US micro-breweries and European beer makers, the requirements may De totally different. For US microbreweries, it is unlikely that 95% of the product reaches consumers within 60 days of bottling. Also, European beer makers (and to a lesser extent, US micro-breweries) consider it desirable for bottled beer to take on what is characterized by beer tasters as a "papery/cardboard" flavor, a characteristic associated with at least partial oxidation of the beer in the bottle. This is strictly an undesirable attribute for the lighter bodied, more delicately balanced American beers From these few considerations, it becomes obvious that setting the acceptable oxygen permeation rate, including zero oxygen permeation shelf life requirements, is not always a simple matter. But it can be predicted and calculated in most cases and empirically derived in other cases. Once known, the methods of adjusting the oxygen scavenging capacity and/or zero oxygen permeation shelf life required of the bottle may be achieved by one or a combination of several of the methods of this invention as disclosed later in detail.

Published PCT Application (WO 96/18686 published on Jun. 20, 1996) discloses the use of aliphatic polyketone materials as oxygen scavengers. This reference has no examples of fabricated zero oxygen permeation bottles. There is no experimental data in the reference other than primary aliphatic polyketone permeability coefficients, and it is unclear whether these data were experimental or supplied by the resin manufacturer. The oxygen scavenger performance described in the reference is insufficient by several orders of magnitude to maintain zero oxygen permeation, i.e., the scavenger capacity is insufficient to consume the oxygen at the rate at which it reaches the scavenger layer by permeation through the outer PET layer.

Japanese patent document 3-275327 laid open on Dec. 6, 1991 describes a blown bottle having walls which include an "an oxygen impermeable" layer of a "methoxyarylenediamine". The data in this reference show a reduction in oxygen permeation down to 28% of the amount passed using PET only bottle walls. This amount is inconsistent with the goal of this invention which is zero oxygen permeation.

A single layer (homogeneous and monolithic) oxygen scavenging bottle wall is disclosed in European Patent Application EP 380,830 published on Aug. 8, 1990. This reference discloses OXBAR bottle walls (suitable for making beer bottles according to the teaching). OXBAR is a blend of about 96 wt % true PET, about 4 wt % MXD6, and a solution of $C_8$–$C_{10}$ cobalt carboxylates having about 10 wt % cobalt as metal deployed so as to provide about 50 ppm cobalt in terms of the weight of the blend. MXD6 is a polyamide prepared from equi-molar amounts of adipic acid and metaxylene diamine. According to the reference, the presence of the MXD6 not only serves as an oxygen scavenger but also enhances the ability of the PET to retard egress of $CO_2$ from the bottle cavity out through the bottle walls. Any bottles made according to this reference would have some serious deficiencies including, among others, (1) loss of recycle possibilities, (2) higher cost since the entire bottle consists of oxygen scavenger material, (3) no opportunity for use of recycled PET since the homogeneous walls are in contact with the bottled product, (4) potential excess leaching of cobalt into the bottled product, (5) no means to efficiently and cost effectively adapt bottle oxygen scavenging capacity to required shelf life, and (6) rapid loss of oxygen scavenging capacity (even in the preform stage) because of blatant attack of oxygen from air directly on the oxygen scavenger moiety. While not disclosed in the reference, applicants have speculated on the effectiveness of a bottle comprising an outer layer of PET, a middle layer of OXBAR, and an inner layer of PET. The cost (very thick layer of OXBAR needed to supply necessary oxygen scavenging capacity) and recycle issues would still be present in such an embodiment.

The only significant disadvantage of using multilayered bottle walls is that more complex bottle making machinery is required to form the multiple layers. The advantages which accrue from the use of multilayer bottle walls far out weigh the single advantage of simpler processing associated with a homogeneous single layer bottle wall. Typically, bottle wall embodiments of this invention are three layer constructions of Layers A-B-C. Layer A is the outer layer forming the exterior of the bottle and is in contact with the outside air. Layer B is the oxygen scavenger layer. Layer C is the inner layer and defines the bottle cavity. Among the advantages of such a multilayered construction are (1) ability to use recycled PET in Layer A, (2) ability to dilute (within limits) the scavenger layer, Layer B, with recycle or virgin PET so as to easily and cost effectively adjust zero oxygen permeation capacity to the planned shelf life of the product, (3) isolation of the packaged (bottled) product from the oxygen scavenging layer via Layer C (Layer C is normally virgin PET) (4) isolation of the oxygen scavenging layer from oxygen in air because of the presence of outer Layer A, and (5) retention of recycle ability as the multilayer bottles of this embodiment of the invention are typically over 99.6% PET and PET segments Also envisioned is the use of a 5 layer bottle wall of the type A/B/A'/B/A where A is PET. B is the scavenger layer(s) either neat or diluted and A' is also PET, especially recycled PET.

DETAILED DESCRIPTION OF THE PREFERRED EMBODIMENTS

Figure 1:
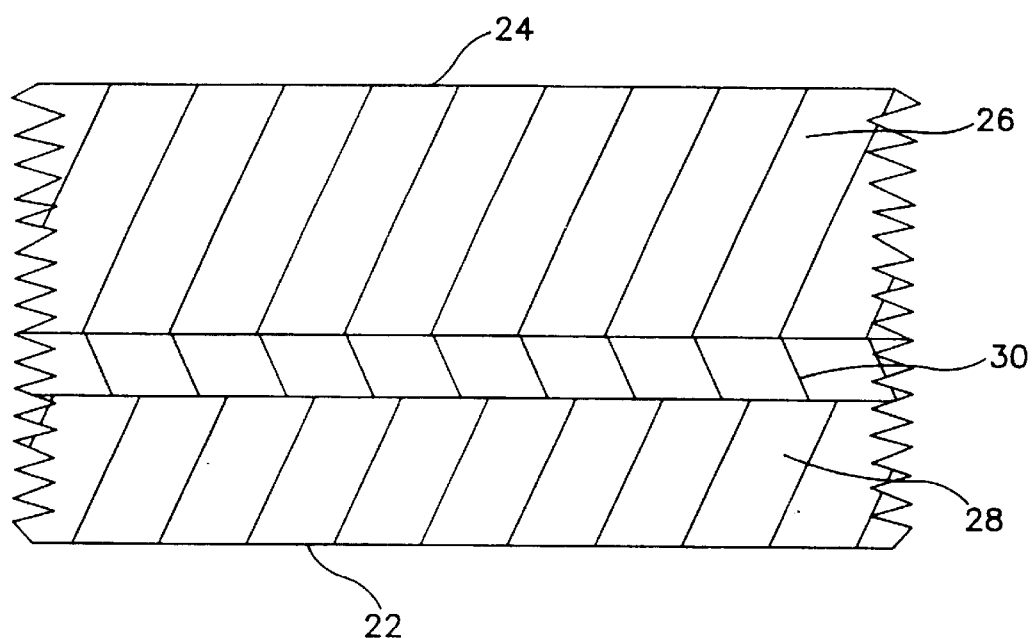
FIG. 1 is a cross sectional view of the preferred zero oxygen permeation multilayer bottle wall construction.

For the purposes of this invention, it is useful to define substantially zero and near zero oxygen permeation bottles. Substantially zero oxygen permeation bottles are bottles which permit no reliably measurable ingress of oxygen into the bottle cavity over the target shelf life of the bottled product under specified storage conditions. In the absence of a specified amount of oxygen permeation which can be tolerated by the product, substantially zero oxygen permeation will be defined as no more than 1 ppm (in terms of weight of the bottled product) of oxygen permeation into the product for the target shelf life of the bottled product. In the absence of a specified target shelf life, target shelf life, for the purposes hereof, will be intended to define a time period typically in the range of about 30 to 365 days, more specifically in the range of about 60 to 365 days, and most specifically in the range of about 60 to 180 days. Also, in the absence of specifically defined storage conditions, specified storage conditions, for the purposes hereof, are defined as ambient temperatures (from about 4° C. to about 25° C.). Near zero oxygen permeation bottles are bottles which retard the ingress of oxygen into the bottle cavity to levels equal to or less than the amount specified for the given application and/or for the target shelf life of the bottled product under specified storage conditions. For near zero oxygen permeation bottles, target shelf life will be in the range of about 30 days to 2 years and specified storage conditions are the same as defined above for substantially zero oxygen permeation bottles.

In a general sense, this disclosure involves the combination of several inventive elements in most embodiments in order to achieve bottles having oxygen scavenging qualities and capacities as defined above. It has been found that the novel oxygen scavenging copolyester compositions can be readily adapted to fabricate zero and near zero oxygen permeation multilayer bottles and containers using commercially available process equipment. As such one of the inventive elements involves the use of known equipment, apparatus, and machinery used in fabrication processes for multilayered bottles in a process for making the oxygen permeation resistant bottles of this invention. Another inventive element is related to the use of the oxygen scavenger copolyester compositions as a layer (or at least comprising a layer) of the multilayer bottle. Another inventive element involves the simple but eloquent techniques disclosed for adjusting the oxygen scavenging capacity of the manufactured bottles to the planned application in the most cost effective manner. Combinations of these inventive elements serve to define the various embodiments of the novel zero oxygen permeation multilayer plastic bottles of this invention.

The size (volume) of the substantially zero and near zero oxygen permeation bottles of this invention will be in the range of 0.03 liters to about 4 liters. The smaller volume bottles having a capacity of about 0.03 liters would be used, e.g., for bottling of individual cocktails as are frequently used by airlines. The larger volume bottles having a capacity of about 4 liters would be used, e.g., for bottling wines such as in the double magnum size. Bottles of in between size would be appropriate for beer, and numerous other oxygen sensitive products as recited elsewhere in this specification. While the bottles of this invention are intended mainly for storage of comestible products, the bottles would also be suitable for use with most oxygen sensitive non-corrosive products capable of being stored at ambient temperatures and pressures. As an extreme case, e.g., the bottles of this invention would not be suitable for storage of liquid oxygen, not only because it is outside the useful storage pressure and temperature range, but also because liquid oxygen would consume all of the oxygen scavenging capacity of the bottles in a very short time period. In order to be economically feasible, the amount of material used in the bottles of this invention must be on the order of magnitude of that used in conventional polyester bottles. The amount of material is directly related to the total wall thickness of the bottles and would typically be in the range of about 0.1–2 millimeters (4–80 mils). Thus, in one preferred embodiment, this invention discloses a substantially zero oxygen permeation thermoplastic container for storage of a comestible product having a volume in the range of about 0.03–4 liters and a multilayered wall of total thickness in the range of about 0.1–2 millimeters. The containers and bottles of this invention may further comprise a base which may be optionally of a monolithic construction and may also be optionally thicker than the walls as a means to provide oxygen barrier properties to the non-layered base. The containers and bottles of this invention may further comprise a segment suitable for attachment of a sealing means or bottle cap. This segment may be optionally of a monolithic construction and may also be optionally thicker than the walls as a means to provide oxygen barrier properties to the non-layered segment.

In another preferred embodiment this invention discloses a near zero oxygen permeation thermoplastic bottle having a comestible product storage cavity, said bottle comprising a base which defines the bottom of the bottle cavity and a multilayered, generally cylindrical side wall attached to the base and extending away from the base forming the wall of the bottle cavity and providing necessary volume to the bottle cavity, said side wall terminating so as to define an opening at the top of the bottle cavity suitable for attachment of a bottle cap wherein an inner layer of the side wall is comprised of a copolyester oxygen scavenger formulation comprising predominantly polyester segments and an oxygen scavenging amount of polyolefin oligomer segments, and wherein said bottle, after filling and capping, has sufficient oxygen scavenging capacity (a) to consume and deplete oxygen within the bottle cavity, (b) to consume and deplete oxygen which may enter through the bottle cap opening, and (c) to consume oxygen at a rate about the same as the rate at which oxygen from air reaches the scavenging inner layer, wherein the nearly complete oxygen consumption under (a), (b) and (c) are maintained at least at an oxygen depletion level required for a target bottled product shelf life under a specified storage condition.

In another preferred embodiment, this invention discloses a process for making a multilayered oxygen scavenging bottle comprising the steps of:

(i) forming a first layer of resin using multilayered bottle making apparatus, (ii) forming a second layer of resin using multilayered bottle making apparatus, (iii) forming a third layer of resin using multilayered bottle making apparatus, and (iv) transforming said first, second, and third layers of resin into a finished multilayered bottle using multilayered bottle making apparatus;

wherein said apparatus has means (A) to separately process at least two different resins and (B) to form a layered bottle having at least three layers, and wherein at least one of the layers of the bottle comprises a copolyester oxygen scavenger resin formulation comprising predominantly polyester segments and an oxygen scavenging amount of polyolefin oligomer segments.

The preferred embodiments are directed not only to packaging articles, but also processes for making the articles, compositions used for making the articles, and methods of cost effectively adjusting oxygen scavenging capacity of the articles As such, it is most convenient, for the purposes of this specification, to sequentially disclose inventive elements (I) the multilayered bottle making processes encompassed by this invention, (II) the copolyester oxygen scavenger compositions encompassed for use in at least one of the bottle layers, and (III) techniques and various embodiments for most economically adjusting the oxygen scavenging ability of the bottles to suit the planned application.

I. Multilayered Bottle Making Equipment and Methods

In all instances, the layer comprising the copolyester oxygen scavenger compositions will be an inner layer of the bottle. For this disclosure an inner layer is defined to be an inner layer of the bottle wall. An inner layer is not a layer which is directly in contact with air. Also, an inner layer is not a layer which defines the bottle cavity and, as such, it is not a layer in contact with the bottle contents. In most embodiments of this invention, three layers will be preferred.

The term multilayer blow molding by co-extrusion refers to a technique to make a blow molded product by using two or more extruders and introducing the hot molten resins into a die and by joining them in a die or outside the die. In the simplest terms, it is only necessary to attach auxiliary extruders and the multilayer die to a conventional blow molding machine. Co-extrusion of the same materials (resins) presents few, if any, problems. However, there are many difficulties involved in bottle molding by co-extrusion of different resins. Some of these difficulties include (1) thermal decomposition of the less stable resins, (2) poor moldability, (3) insufficient adhesion strength between layers, (4) poor fusion at the pinch-off sections due to different melting temperature and different rheological characteristics of the molten resins, and (5) delamination due to different shrinkage forces between the layers after molding and during cooling after hot filling of bottles. Of these, the greatest problem is the poor adhesion between the layers.

A typical formulation used as a layer in oxygen scavenging multilayered bottles comprises a copolyester comprising about 96 weight % PET segments and about 4 weight % polybutadiene (PBD) oligomer segments. This typical formulation is co-extruded, optionally with PET diluent, as a middle layer in a bottle wall typically sandwiched between two layers of PET. The PET resin and the PET/PBD copolymer resin are virtually identical except for the small percentage of PBD segments As such they also have very similar properties and many of the problems noted above for co-extrusion of dissimilar resins are not present when PET and PET/PBD copolymer are co-extruded for production of multilayered bottles. Accordingly, processes and equipment lacking some or many of the special features described in the embodiments which follow are suitable for use in multilayer bottle production when one of the layers comprises a copolyester oxygen scavenging formulation of this invention. Of course, for production runs, manufacture of the multilayered bottles of this invention can take place on current state-of-the-art multilayered bottle making equipment already in place even though the process of making bottles having layers of PET/copolyester scavenger/PET are amenable to bottle making equipment much less sophisticated, particularly in terms of less need for separate temperature control of the resins during injection molding of bottles and bottle preforms. Bottle making equipment, including production of bottle preforms, comprising means for separate injection of two different resins for making layered bottles or bottle preforms operating at about the same resin temperature for both resins comprises a general embodiment of this invention provided one of the resins is a copolyester scavenging resin formulation of this invention. The following 13 U.S. patents are hereby incorporated by reference in their entirety:

| U.S. Pat. No. 4,717,324 (Schad et al.) |
| U.S. Pat. No. 4,710,118 (Krishnakumar et al.) |
| U.S. Pat. No. 5.028,226 (De'ath et al.) |
| U.S. Pat. No. 5,232,710 (Miyazawa et al.) |
| U.S. Pat. No. 5,520,877 (Collette et al.) |
| U.S. Pat. No. 5,533,881 (Collette et al.) |
| U.S. Pat. No. 4,979,631 (Krishnakumar et al.) |
| U.S. Pat. No. 5,141,695 (Nakamura) |
| U.S. Pat. No. 4,990,301 (Krishnakumar et al.) |
| U.S. Pat. No. 4,957,682 (Kobayashi et al.) |
| U.S. Pat. No. 4,107,362 (Valyi) |
| U.S. Pat. No. 5,474,735 (Krishnakumar et al.) |
| U.S. Pat. No. 5,032,341 (Krishnakumar et al.) |

Embodiment I-A, Multilayered Co-Extruded (Resins Co-Injected or Sequentially Injected) Blow Molded Bottles Including Use of Bottle Preforms A process showing simultaneous injection is disclosed in U.S. Pat. No. 4,717,324 (Schad et al.). A prime feature of the Schad et al. patent is to provide individual hot runner systems for each resin, from the resin source to the mold cavity, maintained and controlled independently at the temperature which is optimum for processing the selected resin. A further feature is to provide a nozzle structure so constructed and arranged as to provide channels individual to each resin with Individual heating means for maintaining each channel at a temperature which is most satisfactory for the resin progressing through the channel. Also disclosed is the use of plural mold cavities which are simultaneously filled with each type of resin producing a plurality of multilayered articles simultaneously. This method is especially suited to the production of three and five layer bottle preforms comprising inner layer(s) of EVOH always sandwiched between PET layers. For this invention, applicants use layers of copolyester oxygen scavenger in lieu of or in addition to layers of EVOH.

A sequential or simultaneous injection process for multilayered bottles is disclosed in U.S. Pat. No. 5,141,695 (Yoshinori Nakamura). The Nakamura patent describes production of five and four layer bottomed preforms using up to three different resins from a single nozzle having three flowpassages. The preforms are subsequently made into hollow containers by blow molding or orientation molding. Nakamura lists many resins which are suitable for forming the layers in the blown bottle including PET with EVOH. For this invention, applicants use layers of copolyester oxygen scavenger in lieu of or in addition to EVOH layers with PET.

Another example of a sequential injection process for formation of multilayered bottle preforms is disclosed in U.S. Pat. No. 4,710,118 (Krishnakumar et al.). The Krishnakumar patent encompasses production of five layer bottles via formation of five layer bottle preforms having layers comprising resins A-B-C-B-A. Layers A and C may be the same and are normally PET. In some embodiments, Layer C may be recycled and/or reclaimed bottling polyester. The B layers are normally EVOH and are normally much thinner than would be found in constructions having only a single layer of EVOH. The two thin layers of EVOH have better barrier properties than a single thicker layer of EVOH. The Krishnakumar et al. patent also discloses novel manifold and valve systems affording separate control for each layer injected and also separate control of supply manifold temperature. For this invention, applicants use layers of copolyester oxygen scavenger in lieu of or in addition to EVOH layers with PET.

Especially preferred for multilayered bottles comprising oxygen scavenging copolyester layers are processes where the scavenging copolyester layer is not centered in the bottle wail between two equal thickness PET layers The walls of these bottles and bottle preforms may be designated as comprising resin layers A1-B-A2. Layer A1 is PET or another bottling polyester and outside skin of the bottle. Layer A1 polyester may be virgin, recycle, reclaimed or mixtures of the preceding. Layer A2 is also PET or other bottling polyester and is the layer which defines the bottle cavity. Layer B is the copolyester scavenger. Generally the thickness of PET layer A1 will be in the range of about 2 to 10 times the thickness of PET layer A2. This type of structure affords the copolyester scavenger layer a good opportunity to deplete unwanted oxygen in the bottle cavity since the oxygen has to traverse only the very thin PET layer A2 to reach the scavenger layer where it is consumed. Conversely, oxygen from air outside of the bottle has to traverse the much thicker PET layer A1 before it reaches the scavenger layer and is consumed. As such the thicker PET layer toward the outside of the bottles helps prevent ingress of oxygen to the scavenger layer thereby extending the useful lifetime of the scavenger. Such a bottle and bottle preform construction is disclosed in U.S. Pat. No. 4,990,301 (Krishnakumar et al.). The Krishnakumar '301 patent discloses the use of EVOH layers (centered and off centered) sandwiched between layers of PET. Also disclosed in the '301 patent is the use of multi-passage coaxial nozzles and supply means for separately supplying different resins to the nozzle passages which permits separate and simultaneous injection of different resins into the bottle preform mold. Use of PET outer layers and EVOH inner layers is disclosed. For this invention, applicants use layers of scavenging copolyester in lieu of or in addition to EVOH layers with PET.

An injection molding apparatus which includes similar co-injection modules each provided with common supplies and supplied with different resin materials at intermediate pressure by a plurality of extruders is disclosed in U.S. Pat. No. 5,028,226 (De'ath et al.). In the De'ath et al. patent, each resin is injected by an injector directly into the associated nozzle and is controlled solely by injector operation, and without the use of any control valve between the injector and the nozzle. This process can accommodate up to seven layers in the preform but typically there are five layers and only two or three resins. For this invention, applicants use a layer construction A-B-C-B-A where A and C are PET layers and at least one of the B layers is comprised of an oxygen scavenging copolyester composition.

An injection molding process where the multilayered bottle preform is held in the vertical position during manufacture is disclosed in U.S. Pat. No. 4,957,682 (Kobayashi et al.). The Kobayashi patent discloses the production of three layered containers and preforms, i.e., a bottle wall having layers A-B-A. A key difference is that the injections are sequential and delays between injections of resin are disclosed In a process typical of the Kobayashi patent (1) outer resin layer A is injected, (2) after a delay of up to three seconds, middle layer B is injected, and (3) after a further delay of up to one second, the second layer of A is injected. The sequential injection with delays provides improved uniformity of the B layer. The resins disclosed are PET (A layers) and EVOH (B layer). For this invention, applicants use layers of oxygen scavenging copolyester as layer B in lieu of or in addition to EVOH layers with PET generally comprising the A layers.

A process for making multilayered bottle preforms by providing a multiply molding hot runner mold including a plurality of nozzle bodies for injecting a plurality of different resins to form a multilayered product is disclosed in U.S. Pat. No. 5,232,710 (Miyazawa et al.). The hot runner mold comprises a plurality of hot runner blocks each having a runner for conducting each resin into the corresponding resin body. The hot runner blocks are stacked one above another with a thermal insulation layers situated between the stacked runner blocks. Each hot runner block has a separate temperature control so as to maintain each resin at the optimum processing temperature. Typically three layered bottles are made of PET-EVOH-PET resin layers. For this invention, applicants use layers of oxygen scavenging copolyester in lieu of or in addition to EVOH layers with PET layers.

Embodiment I-B. Overmolding/Lamination Process for Preparation of Multilayered Bottles and Bottle Preforms Published PCT application having International Publication Number WO 95/00325 and publication date of Jan. 5, 1995 typically discloses a three layer PET-EVOH-PET bottle and bottle preform. The outer PET layer is comprised of post consumer (recycled) PET. The inner PET layer which defines the bottle cavity and is in contact with the bottle contents is virgin PET. The EVOH layer may be omitted when there is no need for oxygen barrier properties to be imparted to the multilayer container. An annular flange in the virgin PET layer is formed by the mold at the end of the preform which receives the bottle closure device (i.e., the open end of the preform). The flange extends out far enough such that the closure liner contacts only virgin PET while the closure threads are matched onto threads formed of the recycled PET layer. The inner virgin PET layer, thus, is molded over the outer recycle PET layer. For this invention, applicants use layers of oxygen scavenging copolyester in lieu of or in addition to EVOH layers with PET layers.

Japanese Patent Document JP 3,275,327 published on Dec. 6, 1991 discloses a draw blow molded container for hot drinks comprising a PET laminate construction which also features a base of PET and heat-resistant resin with high heat-distortion temperature. The draw blow molded container is composed of a mouth, a shoulder, a body, and a bottom. The body is made of PET. The bottom is composed of a laminate structure of PET and a heat resistant resin having a heat distortion temperature above 100° C. Preferably, the body and base include an oxygen barrier resin layer, such as EVOH, in the laminate structure. The heat resistant resin is, e.g. an aromatic polyester such as PEN. The drink container is especially useful for hot fill applications as heat distortion seen in hot filling of conventional multilayered bottles is eliminated. For this invention, applicants use layers of oxygen scavenging copolyester in lieu of or in addition to EVOH layers with PET and/or PEN layers.

A multilayered plastic container with improved gas barrier properties using an active oxygen scavenger (or getter layer) of resin is disclosed in U.S. Pat. No. 4,107,362. (Emery I. Valyi). Some of the layers are formed by overmolding technology as opposed to co or sequential injection to form the layers in the bottle or bottle preform. Instead, two layers of plastic are placed around a core contained within a mold which is subsequently expanded into a container by blow molding. Finally, a third layer is pressure molded around the two layer sleeve. The result is a seamless multilayered plastic container. The container has three layers and embodiments are disclosed which show the getter in the inner layer as well as embodiments which show the getter in the middle layer. The getter material, which is capable of combining with the unwanted permeating gas, is an additive to the plastic layer in which it resides. For this invention, applicants use layers of oxygen scavenging copolyester as the middle layer in a three layer embodiment in lieu of or in addition to the non-polyester based middle getter containing layer.

Embodiment I-C. Improved Bottle Processes

A method for making bottles having highly crystalline bottle walls with a sparsely crystalline bottle base is disclosed in U.S. Pat. No. 5,520,877 (Collette et al.). According to the disclosure, the Collette et al. bottles are particularly useful as a refillable container which can withstand higher caustic wash temperatures and exhibits reduced flavor carryover. Also, according to the disclosure, the bottles of the Collette et al. are also useful for hot fill applications. The bottle is formed of a single layer comprised of PET from a preform wherein a sidewall forming section of the preform is initially expanded, heated to contract and crystallize, and then re-expanded. The base forming portion of the preform is shielded from the heat treatment and is expanded either before or after the heat treatment step. For this invention, the hot refill capability feature only is exploited and the single layer of PET is replaced by a three layer construction of PET/scavenger copolyester/PET.

Another process for production of hot fill plastic bottles is disclosed in U.S. Pat. No. 5,474,735 (Krishnakumur et al.). The Krishnakumur et al. '735 patent discloses a method and apparatus for forming a plastic container having an enhanced level of crystallinity for improved thermal stability. A substantially amorphous and transparent preform in the molecular orientation temperature range is expanded by a pulse blow process one or more times to form an intermediate article, prior to a final expansion step to the full container dimensions. The pulseblow step is conducted at a relatively high strain rate to maximize the formation of crystal nucleation sites, followed by deflation to relax the amorphous orientation, and the final expansion step is conducted at a low strain rate to minimize the amorphous orientation. The resulting container has a higher thermal deformation temperature and reduced thermal shrinkage and is particularly adapted for use as a hot fill beverage container. A blow mold and fluid supply apparatus is provided, including a metering chamber and piston, for alternatively supplying the high and low strain rate inflations. For this invention, applicants use a three layer construction of PET/scavenger copolyester/PET for the bottle walls instead of a single polyester layer bottle wall.

A method for production of handled bottleware is disclosed in U.S. Pat. No. 5,533,881 (Collette et al.). The Collette et al. '881 patent discloses a process and apparatus for making a blow-molded container from a strain-hardenable polymer The container has deep recesses for secure "post mold" attachment of a handle The container is formed in a modified blow mold having retractable blades. The blades are partially extended for blow molding partial recesses, and then further extended for mechanically forming the deep handle recesses. The mechanical forming operation overcomes the stretch limits imposed by strain-hardening of the plastic material during blow molding, and the "post-mold" attachment of the handle provides a reduced cycle time and lower level of defects compared to the known "in-mold" handle forming operations. For this invention, applicants use a three layer construction of PET/copolyester scavenger/PET for the bottle walls instead of a single polyester layer bottle wall.

A process of forming a three and/or five layer bottle preform is disclosed in U.S. Pat. No. 5,032,341 (Krishnakumar et al.). The Krishnakamur et al. '341 patent discloses a plastic preform from which a plastic container is blow molded. The preform replaces a three layer preform by providing a preform which is of a five layer construction in the base forming portion thereof and wherein a secondary material which forms the core layer of the three layer preform construction is divided into an inner intermediate layer and an outer intermediate layer by a third injection of material. The third injected material is preferably the same material as the primary material which is first injected. This results in the reduction of the cost of the preform and also provides, remaining in the injection nozzle, a quantity of the last injected material which is the same as the first injected material for the following preform in the same preform injection mold cavity. The bottle preform is an A-B-A three layer type preform where the last part of the B layer is filled with less expensive C material such that the base becomes five layer (A-B-C-B-A) while the walls are three layer (A-B-A).

This serves to reduce the amount of B layer material in the bottle base and thus reduces overall container cost. For this invention, A is a bottling polyester such as PET, B is an oxygen scavenging copolyester resin formulation and C is a substance less expensive than the B layer, e.g., bottling polyester or recycled/reclaimed bottling polyester.

Embodiment I-D. Techniques Which Minimize Delamination

A vented multilayer barrier container is disclosed in U.S. Pat. No. 4,979,631 (Collette et al.). The Collette et al. '631 patent discloses blow molded plastic containers wherein at least the body of such containers is of a laminated construction including, for example, a barrier layer which in the case of the container receiving carbonated products would be a gas barrier layer. It has been found that delamination of such bottles does occur and this is now solved by selectively providing the container body with minute vent openings which do not extend entirely through the container body, but into that area where delamination occurs where there is likely to be an accumulation of a permeant, such as $CO_2$ from carbonated beverages contained in the bottle cavity.

The minute vents may be formed in the exterior wall of the container either by way of piercing pins or by utilizing a laser. In the case of the piercing pins, the pins are incorporated in the blow mold for blow molding the container from a preform and are generally placed along the parting lines of the blow mold and also in central parts of the wall. The construction and operation of the piercing pins may be provided in several forms. Delamination is not a problem in bottles having three layer walls comprising PET/scavenging copolyester/PET using typical copolyester formulations because of the similarity of properties of the two resins. However, use of oxygen scavenger copolyester which is heavily loaded with polyolefin oligomer segments (e.g. over 12 weight % of the copolyester derives from polyolefin oligomer segments) represent instances in which applicants would make use of special delamination minimization techniques such as minute vent openings as disclosed in this embodiment.

Other techniques to minimize delamination, such as the use of adhesives, are well known in the art. Another method of making multilayer preforms which resist delamination involves cooling the preform while it is still on the core. In this embodiment, the cores and preforms are removed from the mold cavities as soon as it is possible to do so without significant physical preform deformation. The preforms are then cooled on the cores for an advantageous time period which prevents delamination of the preform layers. Cooling of the preforms outside the mold cavities is also faster and permits more rapid cycle times when means are available, such as a rotating turret, for use of multiple cores. The use of adhesives or preform cooling is envisioned by applicants in instances where the bottles produced would benefit from such additional treatment.

II. Oxygen Scavenging Copolyester Formulations

As previously indicated, the oxygen scavenger compositions are block copolycondensates containing predominately polycondensate segments and an oxygen scavenging amount of polyolefin oligomer segments. Predominately means that at least 50 weight % of the copolycondensate may be attributed to polycondensate segments. The preferred polycondensate segments, especially for bottling use, are polyester segments. For layers in multilayered bottles in which some of the layers are PET and/or PEN, segments of the block copolyester comprising PET and/or PEN are especially preferred. A primary reason is that the oxygen scavenging copolyesters most closely emulate the polyester from which its polyester segments are derived. PET and PEN are the polyesters of choice for bottles because of their clarity, rigidity, and long history of usage for food and beverage storage. Use of polyesters other than PET and/or PEN for the A layers in an A/B/C (A is outer layer) layered bottle construction would warrant the use of polyester segments derived from the polyester of layer A in the copolyester formulation of layer B of the bottle. Frequently, the A and C layers of an A/B/C layered bottle construction are the same, except that the A layer may be recycled polyester since it is isolated from the contents of the bottle cavity. The polyolefin oligomer segments of the copolyester are the moieties responsible for the oxygen scavenging capability.

While not intended to be bound by any theory, applicants are subscribers to the school of thought which believes that the mechanism of oxygen uptake in hydrocarbon materials, such as polyolefin oligomers, is by fixation of the oxygen onto the hydrocarbon material via formation of either hydroxy groups or hydroperoxy groups. It is further believed that these groups are formed via a free radical process involving an intermediate peroxy moiety. In a hydrocarbon substance, carbon atoms having only one hydrogen attached (a so called tertiary hydrogen) are more susceptible to free radical formation than carbon atoms having two hydrogens attached (so called secondary hydrogens) which are in turn are more susceptible to free radical formation than carbon atoms with three hydrogen atoms attached. Applicants further believe that allylic hydrogen atoms (hydrogen atoms attached to a carbon atom adjacent to a double bond) are also subject to free radical formation Applicants recognized that hydrocarbons such as polyolefins, especially polydienes provided a potentially good source of secondary and tertiary hydrogens as well as allylically activated hydrogen atoms. Applicants subsequently devised methods for incorporation of these oxygen scavenging hydrocarbon moieties into the bottling polyesters via formation of copolyesters using terminally functionalized polyolefin oligomers. The copolyester oxygen scavenger systems and compositions are fully disclosed in co-pending U.S. application Ser. No. 08/717, 370 filed Sep. 23, 1996 which is hereby incorporated by reference in its entirety.

The polyolefin oligomer segments (of the block copolyesters which comprise the formulations used in bottle layers) are prepared for copolycondensation by first functionalizing the polyolefin oligomer segments with end groups capable of entering into polycondensation reaction. This is an important and novel feature of these formulations because the polyolefin oligomers are, in effect, addition polymer segments incorporated into a polycondensate. Functionalization of the polyolefin oligomers with end groups affords a convenient method for incorporation of addition polymer segments into a copolycondensate. There are many end groups which can enter into polycondensation reactions but the preferred end groups are hydroxy (—OH) and carboxy (—COOH) because use of such end groups leads to a copolyester having all polyester linkages between polyester segments and polyolefin oligomer segments. For example, amino (—NH$_2$) end groups are very acceptable but lead to formation of some polyamide type linkages in the vicinity of the polyolefin oligomer segments of the copolyester. Those skilled in the art will recognize that some or all of the hydrogens in the end groups may be substituted with other moieties and still lead to the same copolyester structure.

A preferred polyolefin oligomer is polybutadiene (PBD) because it has good oxygen scavenging capacity and reacts quickly with oxygen especially in the presence of a transition metal catalyst, such a cobalt. Especially preferred is a dihydroxy functionally terminated polybutadiene oligomer in the molecular weight range of about 1000 to 3000 because it yields high clarity copolyester when made into a block copolycondensate having predominantly PET, PEN, or other bottling polyester segments and also because it is available commercially in the form and purity required. The polyolefin oligomer segments are responsible for the oxygen scavenging capability of the copolyester scavenger systems and are present only to the extent needed to furnish the desired oxygen scavenging capacity. The polyolefin oligomer segments would normally represent less than 50 weight % of the copolycondensate with a preferred weight % range for the polyolefin oligomer segments in the range of about 2 to about 12 weight % of the copolycondensate. Copolyesters comprising about 2 to about 12 weight % polybutadiene segments with the rest of the weight comprising PET, PEN, and/or other bottling polyester segments, including PETB, PETG and APET, are especially preferred because of the high clarity of these copolyesters, because they are easily biaxially oriented, and because they have glass transition temperatures well above room (storage or ambient) temperatures. PETG is modified PET wherein up to about 40 mole % of the polyethylene glycol (as monomer) is replaced with an equivalent mole % of cyclohexane substituted with hydroxymethyl groups at the 1,4- or 1,3-positions on the cyclohexane ring. APET is amorphous PET available from Eastman. PETB is modified PET wherein up to about 40 mole % of the terephthalic acid is replaced with 4,4'-dicarboxybiphenyl. It will be understood by those of ordinary skill in the art that additional oxygen scavengers, catalysts (such as cobalt), and other additives may be used in conjunction with the copolyester oxygen scavenger in order to optimize oxygen scavenging and/or other properties. The scavenging copolyesters may be prepared by direct polycondensation processes by including the desired amount of hydroxy terminated polyolefin oligomer and withholding an equivalent amount of dihydroxy monomer (e.g., ethylene glycol) from the direct polycondensation process. Applicants have determined that the preferred mode for carrying out this invention is to prepare the copolyester formulations by transesterification in a reactive extruder (instead of direct polycondensation) using as starting materials a bottling polyester (e.g., PET), and dihydroxy terminated PBD. Embodiments where the scavenging copolyester is prepared in-situ, concurrently with the bottle making process, or otherwise as part of the bottle making process are also within the scope of this invention.

The scavenging copolymer compositions referenced as Embodiments II-A through II-J as listed in Table 1 below were all prepared on a pilot plant scale in the manner as herein described. A ZSK-30 extruder was equipped with a loss-in-weight, PET pellet feeder under a nitrogen blanket. The hydroxy terminated PBD was maintained in a viscous fluid vessel from which it was separately conveyed via a positive displacement pump to a vacuum suction port on the extruder line PET (Shell Clear Tuf® 7207) was extruded at a feed rate of about 8 pounds per hour affording a residence time of approximately 4 minutes while maintaining the temperature in the range of 260 to 270° C. The hydroxy terminated PBD (Elf Atochem RLM20—mw of 1230 or RHT45—mw of 2800) was pumped to the extruder at variable rates to afford weight percentages in the range of 2% to 12% for the hydroxy terminated polybutadiene in the extruder mixing zone. Melt seal designs were used to affect a vacuum zone following the mixing zone prior to the die opening. The extrudates were dry and non-smoking, and were easily pelletized following quench cooling in a water bath. No surface film (hydrocarbon slick) whatsoever could be seen in the water bath, indicative of copolymer formation by transesterification during reactive extrusion. The appearance of a film in the water bath would have indicated the presence of unreacted polyolefin oligomer. Cobalt octoate (Hulls Nuodex® D.M.R. cobalt 6%) was employed at a treatment rate sufficient to afford 50 PPM of Co when the hydroxy terminated PBD was used at 2 weight % and 200 PPM of Co when the hydroxy terminated PBD used at 8 weight %. All scavenging copolymers prepared by the method described above had single glass transition temperatures ($T_g$) in the range of 62.0° C. to 72.9° C. Copolymers prepared by the method described above were suitable for melt processing and capable of processing into bottles and/or layers in multilayer bottles according to the preferred three layer bottle wall embodiment of this invention. In applications requiring copolyesters of higher intrinsic viscosity (I.V.) molecular weight enhancing techniques can be utilized. For example, preparation of the copolyester by direct polycondensation (instead of transesterification) leads to much higher molecular weights for the copolyester.

Alternatively, melt rheology modifiers could be added to copolyester prepared by transesterification to achieve elevated molecular weight for the copolyester.

The copolyester compositions referenced as Embodiments II-K through II-N as listed in Table 1 below were also all prepared by reactive extrusion in a ZSK-30 twin screw extruder. First, PET pellets (Shell Tray Tuf® 1006) were dried in a dessicant oven at 125° C. for a minimum of 8 hours. The pellets were then

TABLE 1

Scavenging Copolyester Formulations

| Embodiment | wt % PBD | PBD mw | Polyester | Comments |
|---|---|---|---|---|
| II-A | 2 | 1230 | PET | |
| II-B | 4 | 1230 | PET | |
| II-C | 4 | 2800 | PET | |
| II-D | 4 | 1230 | PET | 150 ppm Cobalt added |
| II-E | 4 | 2800 | PET | 150 ppm Cobalt added |
| II-F | 6 | 1230 | PET | |
| II-G | 8 | 1230 | PET | |
| II-H | 8 | 2800 | PET | |
| II-I | 10 | 1230 | PET | |
| II-J | 12 | 1230 | PET | |
| II-K | 4 | 1230 | PET | 0.2 to 0.3 wt % pyromellitic dianhydride (PMDA) added to formulation |
| II-L | 4 | 1230 | PETI | PETI is modified PET wherein some of the terephthalic acid is replaced with isophthalic acid |
| II-M | 4 | 1230 | PETN | PETN is modified PET wherein some of the terephthalic acid is replaced with a naphthalene dicarboxylic acid |
| II-N | 4 | 1230 | PEN | | introduced to the feed section of the extruder via a loss-in-weight pellet feeder blanketed with nitrogen gas. The viscous low molecular weight (mw about 1230) polybutadiene diol (R20LM of Elf Atochem) was placed in a pressure vessel and pressurized with nitrogen gas. The liquid was then separately conveyed to the PET melt through an injection port on the extruder via a positive displacement pump. The PET feed rate was set at about 14.4 lb/hr while the diol PBD was delivered at a rate of about 0.6 lb/hr. The residence time used was about 4% minutes which allowed copolymerization to be completed in the extruder. The temperature profile of the reaction was kept in the range of 250–270° C. Volatiles generated from the reaction were removed through an open port of the extruder via a vacuum pump The copolyester extrudate was quenched and pelletized. The finished pellet was packaged in a moisture and gas resistant aluminum foiled bag. To keep the product from oxygen contamination, the whole processing extrusion line was blanketed with nitrogen (including flushing of the storage bags).

PMDA was added to Embodiment II-K as a chain extending agent which served to raise the molecular weight of the copolyester and, thereby, raise the intrinsic viscosity (I.V.) of the copolyesters. For example, the I.V. of the PET 4 wt % PBD (mw 1230) copolyester (Embodiment II-B) was 0.57 which was still adequate for use in bottle making. Addition of 0.2 wt % PMDA raised the I.V. to 0.71 while addition of 0.3 wt % PMDA raised the I.V. to 0.74. Such materials are very closed matched in viscosity to that of true PET (e.g., Shell 7207 PET has a nominal I.V. of 0.72).

For beer bottles, it is necessary to eliminate, or at least minimize, the loss of carbon dioxide ($CO_2$) through the bottle walls. Tests by applicants have produced results showing that modified PET where some of the terephthalic acid monomer has been replaced by isophthalic acid (or equivalent derivatives) and/or where some of the terephthalic acid was replaced by naphthalene dicarboxylic acid (or equivalent derivatives) produces a bottling polyester which has superior $CO_2$ permeation barrier properties. PETI and PETN in Table I are representative of such formulations. As such, suitably modified PET is normally used for beer bottles so as to enhance the $CO_2$ barrier properties of the bottle. Especially preferred are blends and/or mixtures of PETI and PETN. For maximum $CO_2$ barrier effect, similarly modified PET may also be used as the source of polyester segments in the oxygen scavenging copolyester and may also be used as the diluent in the oxygen scavenger layer of the bottle.

III. Optimization to Zero Oxygen Permeation

Another inventive element in this overall invention has to do with the various means disclosed for adjustment of the scavenging capacity to substantially zero or near zero oxygen permeation levels depending on the application. The means disclosed are not only varied but also may be implemented with great ease and facility, in several instances, with fine tuning of the scavenging capacity right up to bottle fabrication and in another instance up to bottle filling. Of course, it may be possible to use more oxygen scavenger and/or thicker layers of scavenger But it is an objective to reach the required degree of oxygen scavenging capacity needed in the most cost effective manner in order to make bottles of commercial viability. Once the degree of oxygen scavenging required has been determined, the methods of adjusting the oxygen scavenging capacity and/or the substantially zero/near zero oxygen permeation shelf life required of the bottle may be achieved by one or a combination of several of the embodiments as disclosed below.

Embodiment III-A Molecular Weight of the PBD Segments in the Scavenging Copolyester Variation of the molecular weight of the PBD segments used in fabrication of the oxygen scavenger copolyester is a technique for adjusting the oxygen scavenging ability of the copolyester as was disclosed in the co-pending parent application filed Sep. 23, 1996 and having application Ser. No. 08/717,370. In that application, Examples 12 and 14 were copolyester formulations comprising 4 wt % PBD segments and 96 wt % PET segments. Example 12 (having PBD of MW 2800) was a much more efficient oxygen scavenger than Example 14 (having PBD of MW 1230) at ambient temperatures and in the absence of cobalt catalyst. Variation of oxygen scavenging capacity or shelf life by this technique is probably the most retrospective method of all disclosed in that the decision must be made prior to fabrication of the copolyester oxygen scavenger system.

Embodiment III-B Wt % PBD Segments in the Scavenging Copolyester

Variation of the wt % of PBD segments in copolyester formulations is another technique which was also disclosed in the co-pending parent application filed Sep. 23, 1996 and having application Ser. No. 08/717,370. This series of related applications encompasses and envisions copolyesters comprising up to 50 wt % PBD segments with the remainder comprising polyester segments. Table 1 above discloses formulations of scavenging copolyester compositions having 2, 4, 6, 8, 10 and 12 wt % PBD segments. Table 2, below, has data which confirm that those compositions having a higher percentage of PBD segments also have a higher oxygen scavenging capacity. The data of Table 2 were taken by the method of Examples 12 to 15 in co-pending parent application Ser. No. 08/717,370.

TABLE 2

Oxygen Scavenging Capacity of Several Copolyester Formulations
(data taken at 22° C. - 150 ppm cobalt catalyst employed)

| wt % PBD segments in copolyester | 0 | 2 | 4 | 6 | 8 | 10 |
|---|---|---|---|---|---|---|
| $O_2$ uptake after 70 days (cc/gram copolyester) | 0 | 5.17 | 10.35 | 15.49 | 19.28 | 20.13 |

Variation of oxygen scavenging capacity or shelf life by this technique is also a relatively retrospective method of those herein disclosed in that the decision must be made at the time of fabrication of the copolyester scavenger.

Embodiment III-C Concurrent Use of other Oxygen Scavengers with Copolyester Scavenger Within the Bottle Walls In FIG. 1, layer 30 represents the middle oxygen scavenging layer of the preferred multilayer bottle wall construction of this invention. While this scavenging layer may, in some embodiments, comprises close to 100% scavenging copolyester, applicants have found advantages to deployment of diluted copolyester. For one, it more easily permits an even distribution of the scavenging system through out the bottle wall. The diluent is typically the polyester of bottle wall outer layer 26 or bottle wall inner layer 28 in FIG. 1. In most instances the polyester of layers 26 and 28 are the same except that the polyester of layer 26 may be entirely or partially recycle material. Any diluent used in layer 30 may also be entirely or partially recycle material.

Another advantage of dilution of layer 30 is that the technique lends itself well to the advance preparation of the formulation to be used as layer 30 and also to advance preparation of single and/or plural concentrates which will comprise layer 30 when the bottle is fabricated. Advance formulation of layer 30 or concentrates therefor allows for simplicity of inclusion of additional oxygen scavengers in the layer which will be available for oxygen scavenging concurrently with the oxygen scavenging copolyester in layer 30. Preferred are photoactive materials which remain inert toward oxygen uptake during bottle storage until irradiated with UV light sufficient to activate them for such purpose and thereby enhance the rate of oxygen uptake. An especially preferred photoactive scavenger is benzophenone. Generally the activating irradiation would be administered just prior to shipment or use (filing) of the fabricated bottles.

Embodiment III-D Extent of Dilution of the copolyester in the Oxygen Scavenging Layer As noted in III-C above, most embodiments involve addition of diluent to the oxygen scavenging copolyester layer of the multilayer bottles. The extent of dilution of the copolyester in the scavenging layer serves as another powerful method of adjusting the oxygen scavenging capacity of the bottle. Typically the diluent comprises from zero to about 95 wt % of the scavenging layer. In several extreme embodiments, diluent in excess of 99 wt % has been deployed. The diluent is typically PET, virgin or recycled, but could be any low cost compatible material. As such, dilution of the copolyester down to only the level required for the given application may substantially reduce the cost of the bottle.

Embodiment III-E Extent of Off-Center Placement of the Oxygen Scavenger Layer Especially preferred for multilayered bottles comprising scavenging copolyester layers are embodiments where the scavenger layer of the bottle is not centered in the bottle wall between two equal thickness PET layers. This may be further understood by reference to FIG. 1. Layer 26, the outer PET layer of the bottle forming bottle exterior 24, is substantially thicker than layer 28, the inner PET layer of the bottle forming bottle interior 22. In practice, the thickness of outer PET layer 26 will normally be in the range of about the same thickness to about 10 times the thickness of inner PET layer 28. For any given total thickness (i.e., sum of layer 26 and 28 is constant), the degree of off-centering plays a role in determining oxygen scavenging capacity and shelf life of bottles. When the outer layer of PET is thick, there will be less oxygen ingress to the scavenger layer and thus shelf life is extended for consumption of oxygen from this source. When the inner layer of PET is thin, more oxygen from inside the bottle, (head space oxygen or from other sources such as ingress through the closure means) can permeate to the scavenger layer through the thin inner PET layer. Thus a thin inner PET layer provides for faster and more thorough depletion of oxygen present within the bottle cavity. In typical embodiments, the scavenging layer (30 in FIG. 1), including diluent if any, typically comprises about 10 wt % of the total bottle weight and the copolyester scavenger in that layer will comprise about 0.5 to about 10 wt % of the bottle depending on degree of dilution. Typically the copolyester scavenger is deployed with about 4 wt % PBD segments in the copolyester As such the bottles of this invention are in the range of 99.6 to 99.98 wt % polyester and polyester segments, and more typically about 99.92 wt % polyester and polyester segments.

It will be understood by those of ordinary skill in the art that oxygen scavenging capacity and/or shelf life of a bottle could also be adjusted by varying the thickness of only the inner PET layer (28 in FIG. 1) or only the outer PET layer (26 in FIG. 1). These inner and outer PET layers may be varied individually and independently. There is no need what-so-ever to retain a constant sum for the thickness of the two layers added together other than for comparison purposes in keeping with a given amount of PET per bottle and/or determining optimum placement of the middle layer. While a thick outer layer of PET would seem to be favorable, economic considerations will generally serve to place a limit on the thickness of the outer PET layer, and in a related manner the amount of PET used in the bottle.

Embodiment III-F Use of Oxygen Scavenger Catalysts

Examples 23 to 26 in co-pending application Ser. No. 08/717,370 clearly indicate that the oxygen scavenging efficiency of the copolyesters can be significantly enhanced in the presence of a transition metal catalyst such as cobalt. Accordingly, the deployment (or lack of deployment) of a catalyst as well as the extent of deployment represent another method or embodiment for controlling the oxygen scavenging capacity and shelf life of the bottles of this invention. The preferred transition metal catalyst is cobalt because its effect on the efficacy of scavenging copolyester is most pronounced. The cobalt is typically deployed in the form of a cobalt carboxylate. Cobalt octoate is preferred because it effective at lower levels of deployment and also is available commercially in a suitable solvent and state of purity. Typically the cobalt is deployed in the range of about 50 to 300 ppm in terms of the weight of the copolyester or (as is further explained below) 50 to 300 ppm in terms of the combined weight of the copolyester plus diluent used in the copolyester scavenging layer of the bottle.

The bottles of this invention are typically three layered and only PET (not the oxygen scavenging layer) is in direct contact with the bottled product. Most glasses used for making glass bottles contain some cobalt which may find its way into the bottled beer. Cobalt is also found in PET as a trace of catalyst left from the cobalt catalyzed polymerization of PET. Several decades ago, it was common practice to add small amounts of cobalt to beer for improving and maintaining head retention. Typically, cobalt is present in bottled beer to the extent of about 0.1 mg/l which was about the detection limit several decades ago. Beer, to which cobalt was added for head retention, had about 1.0 mg/l of cobalt. More recently, during the mid 1980's evidence began to emerge indicating the presence of cobalt could induce cardiomyopathies in some beer drinkers. Only very heavy beer drinkers who were also exposed to massive amounts of cobalt in their occupations were at any health risk. Nevertheless, the intentional addition of cobalt to beer was discontinued at about that time.

The PET/MXD6 single layer bottle previously discussed places the bottled beer in direct contact with the PET/MXD6 blend also comprising 50 ppm of cobalt and creates the possibility for the leaching of cobalt catalyst from the bottling material into the beer. For the multilayered bottles of this invention, beer is in direct contact only with the inner layer of PET (as is the case for any beverage in a PET bottle) and is not in contact with the cobalt catalyzed oxygen scavenging layer. A control test was made and it was found that after 28 days of storage at an accelerated testing temperature of 120° F. (about 50° C.) in a 10 wt % copolyester B layer bottle (100 ppm Co in the B layer), beer bottled therein was found to contain about 0.127 mg/I of Co which compares closely to the control beer from a similarly stored glass bottle found to contain about 0.086 mg/I of cobalt.

In attempting to determine optimum (minimum) cobalt catalyst loading for effective B layer oxygen scavenging to meet the required scavenging and shelf life requirements upon dilution of the B layer with PET, applicants made the surprising observation that dilution of the copolyester in the B layer actually increased the efficiency of it as an oxygen scavenging on a per unit weight basis. Stated otherwise, in the presence of sufficient and constant wt % cobalt catalyst, one gram of scavenging copolyester may be as much as 30% more efficient when used under 4 fold dilution in films. A four fold dilution in the copolyester layer in finished bottle compositions doubled scavenging capacity over 84 days and gave a 50% improvement over 168 days. While not intended to be bound or limited by theory applicants believe that the copolyester (present in the scavenging layer) is acting as an attractant for the cobalt. As such ample cobalt (for catalyst purposes) ends up where it is needed (in the copolyester) regardless of the amount deployed, within the limits of use of this invention. Applicants further believe this property is due to deployment of cobalt catalyst in the form of an aliphatic moiety. Thus, the preferred catalysts are aliphatic cobalt carboxylates. Cobalt octoate is especially preferred because it exhibits these properties, it causes the copolyester to behave optimally toward oxygen uptake, and also because it is available commercially in the solvent, concentration, and state of purity required for the embodiments of this invention. In conducting the experiments which led to the discovery that diluted copolyester has a higher scavenging capacity, it was noticed by applicants that the negative side of this effect is the introduction of a longer induction period before the copolyester reaches its full scavenging potential.

Embodiment III-G Concurrent Use of Oxygen Scavenging Bottle Cap Liners

As was noted previously, one possible source of oxygen ingress into beer bottles is through the bottle cap liner material. The use of a bottle cap liner having oxygen scavenging capability affords a good defense against this possible source of oxygen contamination. Also, an oxygen scavenging bottle cap liner may be used to provide additional scavenging capacity for elimination of head space oxygen since the cap liner is directly in contact with the head space in the bottle. Such bottle cap liners may also be comprised of the copolyester oxygen scavengers of this invention which have oxygen scavenging capacity in both dry and moist conditions. However, the environment of the cap liner permits use of other scavengers which have scavenging capacity only in the presence of moisture, e.g., iron based oxygen scavengers. A bottle cap liner comprising an iron based oxygen scavenger is disclosed in U.S. Pat. No. 4,840,240. The optional use and amount of oxygen scavengers in the bottle cap liner represents another embodiment for controlling oxygen scavenging capacity and/or shelf life of the multilayered bottles of this invention. The preferred bottle cap liners for this invention contain the oxygen scavenger between the outer (metal or plastic) layer of the bottle cap and an inside liner which is permeable to oxygen (and also permeable to water vapor for iron based scavengers). The pervious inside liner serves to isolate the scavenger from the bottled product while allowing head space oxygen to reach the scavenger and thereby be consumed. Such bottle caps comprising an outer metal or plastic layer, an inner oxygen pervious liner/layer and oxygen scavenger therebetween can be fabricated in advance and stored (in reduced oxygen environment if necessary) so as to be ready for immediate use at the time of bottle filling. As such, use of an oxygen scavenging bottle cap liner permits final adjustment of oxygen scavenging capacity and/or shelf life right up to the bottle filling process.

Embodiment III-H Use of Plural Oxygen Scavenging Layers

While most of this disclosure has been directed to bottles having only a single oxygen scavenging layer in the bottle wall, the use of plural oxygen scavenging layers is also envisioned. For example, a five layered bottle wall of construction A/B1/A'/B2/A (where A is PET, B1 is the outer scavenger layer, and A' is virgin or recycle PET, and B2 is the inner scavenger layer) provides a good opportunity for use of recycle PET. This embodiment also creates a construction where Layer B1 may be optimized for scavenging of oxygen permeating in from outside the bottle and Layer B2 may be optimized for scavenging oxygen from within the bottle cavity.

Relationship of Oxygen Permeation Rate to Shelf Life

It is intuitively obvious that a relationship exists between the rate of oxygen ingress into the bottle cavity under specified storage conditions and the shelf life of the bottled product. In the preceding section of this disclosure various means were disclosed for conveniently and cost-effectively adjusting oxygen permeation rates to the required level so as to assure the required shelf life of the bottled product.

Figure 2:
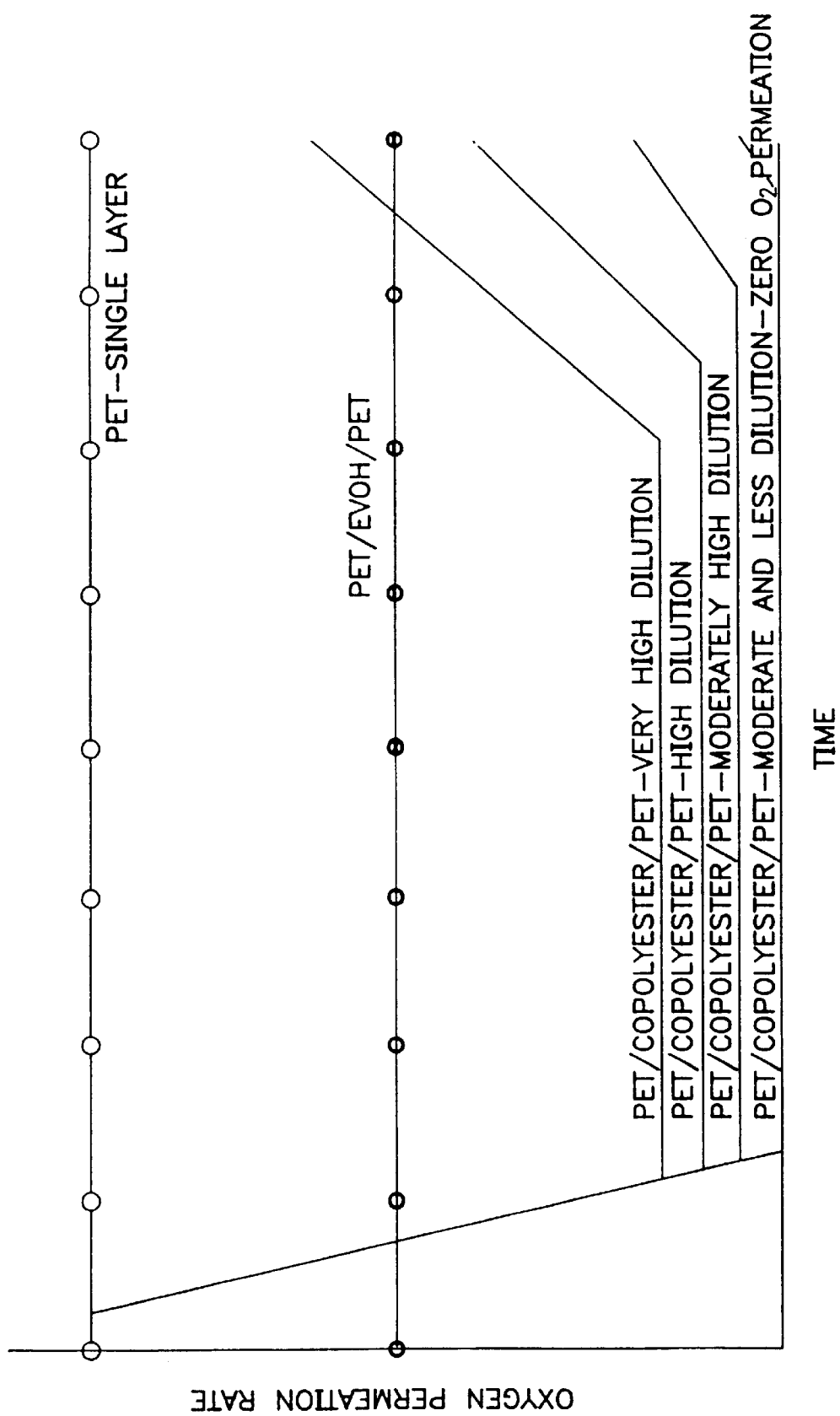
FIG. 2 shows a graph of idealized oxygen permeation data for bottles of three different constructions.
Figure 3:
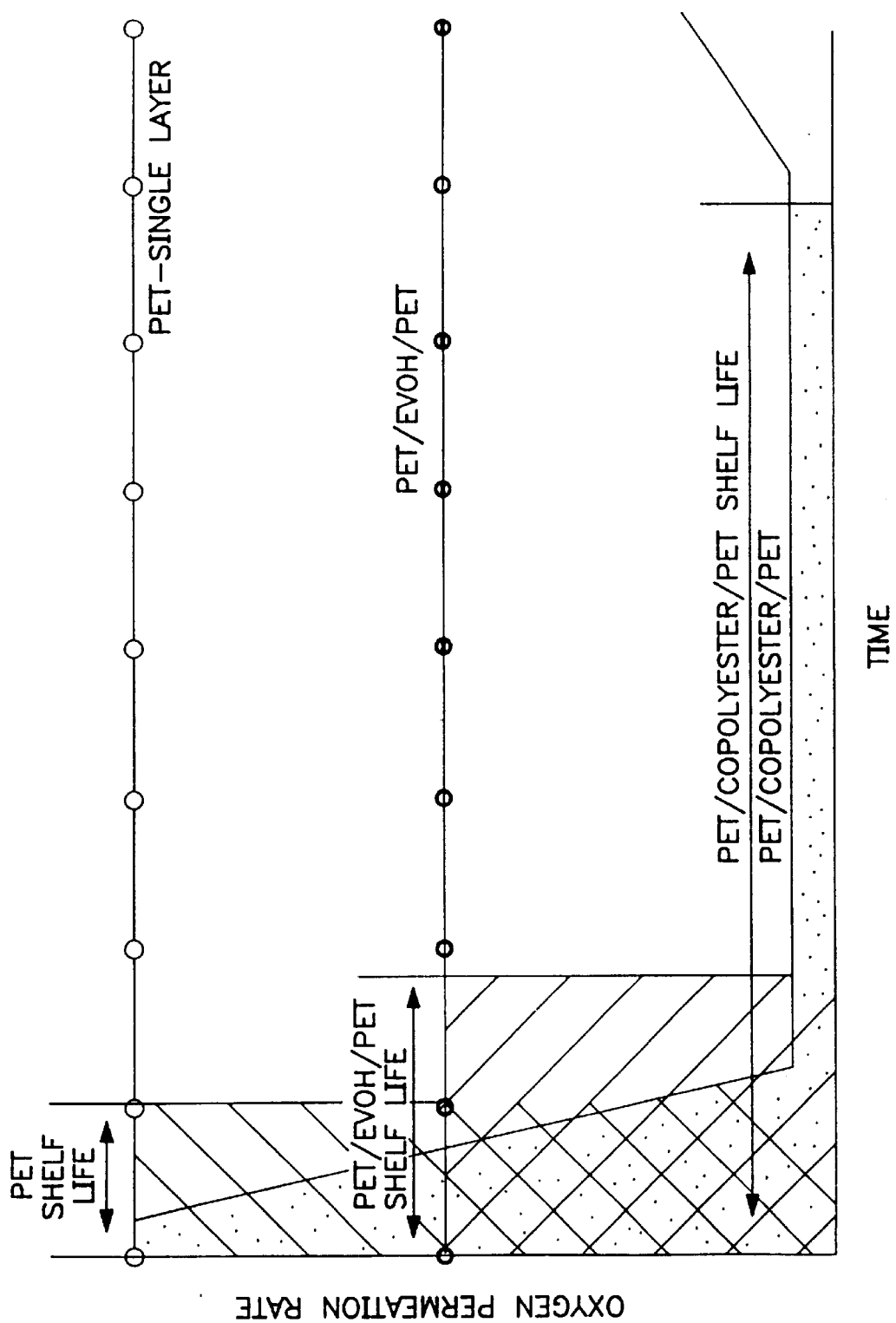
FIG. 3 shows a graph similar to that of FIG. 2 which relates oxygen permeation rates to bottle shelf life.

Making reference to FIGS. 2 and 3 may assist in further understanding the relationship of oxygen permeation rates to shelf life. FIG. 2 represents idealistic data which could be developed for a model of oxygen permeation for plastic bottles. FIG. 2 is a graph showing oxygen permeation rates (in any convenient units of volume per unit area of the bottle wall) on the Y axis. The X axis denotes time. All data are for bottles having a given total (overall) wall thickness. For an actual typical bottle of the invention, total typical wall thickness would be in the range of about 10 to 25 mils. The permeation rate line for a bottle having a PET wall is constant as PET has a fixed $O_2$ permeation rate under a given set of conditions. The permeation rate line for a bottle having a PET/EVOH/PET wall is also constant but always less than PET since the EVOH layer portion of the fixed thickness bottle wall is a better passive $O_2$ barrier than PET The situation for a bottle having a wall of PET/scavenger copolyester/PET is shown at several different diluent levels for the middle copolyester scavenger layer as described in the previous section, (III-D). Because the copolyester is such an outstanding $O_2$ scavenger, it can consume oxygen faster than it permeates through the outer PET layer of the bottle. This feature of the copolyester may be present even at high diluent levels. For the sake of this discussion only, complete oxygen depletion is shown to no longer exist at diluent levels greater than moderate in FIG. 2. In a similar manner, greater diluent levels are shown to be more permeable to $O_2$ and is consistent with the disclosure made in Section III-D above as using the amount of diluent to regulate the $O_2$ scavenging capacity (also rate and bottle shelf life). In FIG. 2, the copolyester bottles are shown to initially have a permeation rate about the same as PET bottles because of an activation period (delay) before the scavenging ability of the copolyester reaches its full $O_2$ scavenging potential. Such delay is relatively unimportant and may be easily overcome by a variety of techniques. One simple means to overcome the delay is to fabricate the bottle in advance and then store the bottle for several days (during the activation period) prior to filling. The scavenging copolyester curves eventually rise back up to the PET level after the scavenging capacity of the copolyester is entirely depleted.

The amount of oxygen reaching the bottle via permeation through the bottle wall is equal to the rate of permeation (Y axis in FIG. 2) multiplied by the duration of such permeation rate (X axis in FIG. 2). Thus, the amount of oxygen reaching the bottle via permeation through the bottle wall is the area under the curve for any of the three curves in FIG. 2. For any given application (bottled product), its tolerance to the presence of oxygen is normally given as a maximum amount of oxygen ingress into the bottle cavity. The product tolerance to oxygen may be given on a relative basis, such as parts per million, but such data are easily converted to a maximum amount of oxygen based on bottle size or weight of product bottled. FIG. 3 shows areas under the curves similar to the curves of FIG. 2. The area under each curve is the same and is equal to the maximum oxygen tolerance of a given product for each of the three curves. Further reference to FIG. 3 shows how the shelf life is easily determined for each type of bottle once maximum oxygen tolerance (area under each curve) is displayed on the axes.

EXAMPLES

Bottle Fabrication

Twelve oz. bottles (433 cc capacity, 31.1 g weight) were fabricated on a Nissei 250TH single step injection stretch blow molding machine. Only one side of the dual-sided machine was utilized. A more complete description of the Nissei 250TH machine may be found by in U.S. Pat. No. 5,141,695 previously cited and incorporated by reference. The unit's 24 mm diameter A side screw was estimated to hold 16 shots for the mold fixture used. The B side screw, of a 2.4 to 1 compression ratio, also was estimated to hold 16 shots when the B layer of an A-B-A bottle construction was targeted for 10 wt % of the total preform. Conditions were established using Shell 5900 PET as a trial B layer because it is similar in viscosity to the scavenging copolyester comprising about 96 wt % PET and about 4 wt % PBD. The copolyester (PET with 4 wt % PBD) formulation was diluted with PET so that the scavenging polyester comprised 25 to 100 wt % of the B layer. Catalyst, when present, was used at 100 ppm of cobalt and benzophenone, when present was used at 100 ppm, both with respect to the total weight of the B Layer (i.e., copolyester plus diluent) The cobalt and benzophenone were fed to the apparatus as previously prepared concentrate pellets mixed with the active layer charge.

A specific example of the process conditions used is described as follows. The A layer extruder was loaded with Shell grade 7207 PET. The B layer extruder was used to melt a dry blended mixture of the following pellets:

a) 97 parts scavenger copolyester PET and 4 wt % PBD (Embodiment II-B)

b) 2 parts blue promoter which is a concentrate of 0.5 wt % Cobalt, as octoate salt, in PET c) 1 part white promoter which is a concentrate of 1.0 wt % benzophenone in PET.

The concentrates in b) and c) above were prepared by melt mixing the appropriate amounts of each component in a twin screw extruder and collecting the pelletized products. The A-side (layer) extruder barrel temperatures from the feed throat to nozzle were set as follows: 265, 265, 265, and 265° C. The corresponding B-side (layer) temperatures were 250, 250, 270, and 260° C. Hot runner blocks were all set at 270° C. and the mold temperature at ~10° C. The total cycle time was approximately 32 seconds/part. Microscopic analysis of the bottle composition indicated that the B-layer thickness was approximately 11% of the bottle wall (10% was the target). The 3-layer thickness varied with position along the bottle being thicker near the neck and thinner near the closed end bottom. Adjustments to process settings or sequencing will be obvious to those skilled in the art who wish to obtain a different distribution of the 3-layer thicknesses.

Examples 1–6

A series of bottles (denoted as Examples 1–6) were made having a total sidewall thickness of about 20 mils, weighing about 31 grams each, having a volume suitable for containing about 12 ounces of beverage, and having a three layer (A/B/C) bottle wall construction. For each of the example bottles, the outer A (PET) layer was about 15 mils, the middle B (scavenging layer) was about 2 mils and the inner C (PET) layer was about 3 mils. For each of Examples 1–6, the scavenging copolyester employed comprised about 4 wt % PBD segments of MW 1230 and about 96 wt % polyester segments. Table 3 below further characterizes the composition of the middle (B) scavenger layer of each example.

Figure 4:
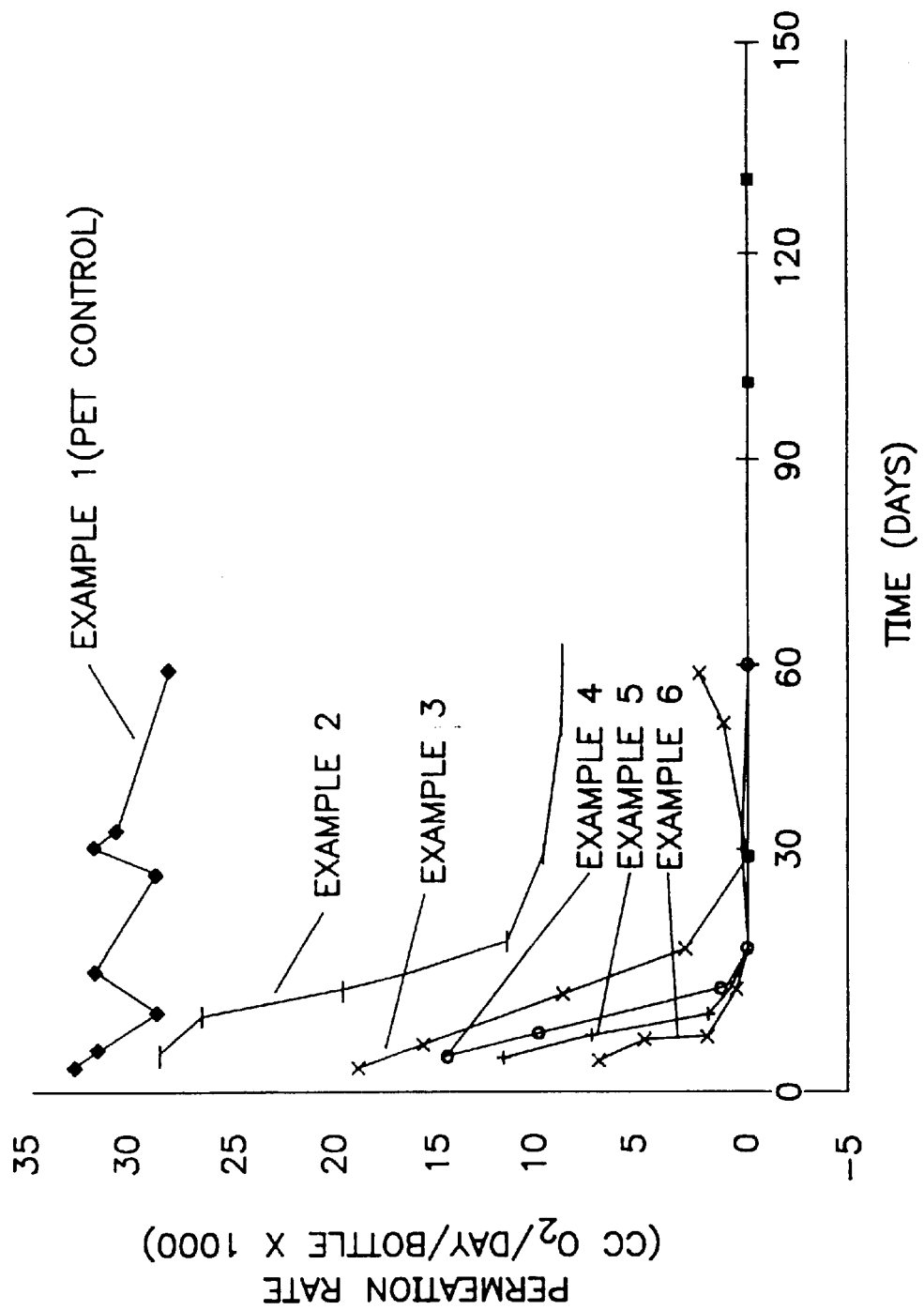
FIG. 4 shows a graph with oxygen permeation data for the bottles of Examples 1–6.

Oxygen permeation data taken for Example Bottles 1–6 are displayed graphically in FIG. 4. The data were taken by purging with nitrogen all the air from the bottles of Examples 1–6. The oxygen permeability was measured using a MOCON Oxtran test unit running at room temperature (about 22° C.) over a period of days. The results (FIG.

4) demonstrated gradual improvement in the oxygen barrier properties of the scavenging copolyester bottles with time. After the copolyester activation period of about three weeks, bottles with sufficient oxygen scavenging capacity (i.e., at least 50 wt % copolyester or more in the middle B layer) and with cobalt present at about 100 ppm exhibited perfect oxygen barrier properties, i.e., zero oxygen permeation. The perfect performance was maintained for over 120 days with no indication of deviation from zero oxygen permeation when the test was terminated after about 300 days. Bottles having a lower percentage of copolyester

TABLE 3

Three Layer Scavenger Bottles
Examples 1–6

| Ex. No. | B Layer Resin Composition (B Layer is approx 10 wt % of bottle) | Cobalt in B Layer (ppm) | Benzophenone in B Layer (ppm) |
|---|---|---|---|
| 1 | 100% PET (control) | 0 | 0 |
| 2 | 25 wt % copolyester 75 wt % PET diluent | 100 | 100 |
| 3 | 50 wt % copolyester 50 wt % PET diluent | 0 | 0 |
| 4 | 50 wt % copolyester 50 wt % PET diluent | 100 | 0 |
| 5 | 50 wt % copolyester 50 wt % PET diluent | 0 | 100 |
| 6 | 100 wt % copolyester 0 wt % PET diluent | 100 | 100 | in the B middle layer (e.g., 25 wt % as in Example 2) afforded insufficient oxygen scavenging capacity to reach zero oxygen permeation, but attained a low (near zero) steady state value. It should be noted that the Y axis of the graph of FIG. 4 is graduated in thousandths of cc of oxygen per day per bottle so that very minor errors and/or misreadings appear as exaggerated deviations.

Examples 7–14

The bottles of Examples 7–14, another series of bottles, were subjected to a different procedure. Each of these bottles was filled with a gas containing 2 wt % oxygen as a method to simulate the presence of head space oxygen, and then sealed in a gas-tight manner by adhesively attaching septa equipped brass plates to the bottles. This should be interpreted as a severe oxygen head space condition as the entire bottle contents was 2 wt % oxygen, not just the small space above the liquid as is the case for a filled bottle. The wt % oxygen in this series of bottles was monitored over a period of days using a MOCON Oxtran test unit at 22° C. and 100% relative humidity. All of bottle Example 7–14 contained 100 ppm cobalt and 100 benzophenone in the B layer Bottle Example 7–14 are further characterized in Table 4.

TABLE 4

Three Layer Scavenger Bottles
Examples 7–14

| Ex No. | B Layer Resin Composition (B Layer is approx 10 wt % of bottle) | UV Applied |
|---|---|---|
| 7 | 100% PET | YES |
| 8 | 100% PET | NO |
| 9 | 100 wt % copolyester 0 wt % PET diluent | YES |
| 10 | 100 wt % copolyester 0 wt % PET diluent | NO |

TABLE 4-continued

Three Layer Scavenger Bottles
Examples 7–14

| Ex No. | B Layer Resin Composition (B Layer is approx 10 wt % of bottle) | UV Applied |
|---|---|---|
| 11 | 50 wt % copolyester 50 wt % PET diluent | YES |
| 12 | 50 wt % copolyester 50 wt % PET diluent | NO |
| 13 | 25 wt % copolyester 75 wt % PET diluent | YES |
| 14 | 25 wt % copolyester 75 wt % PET diluent | NO |

Figure 5:
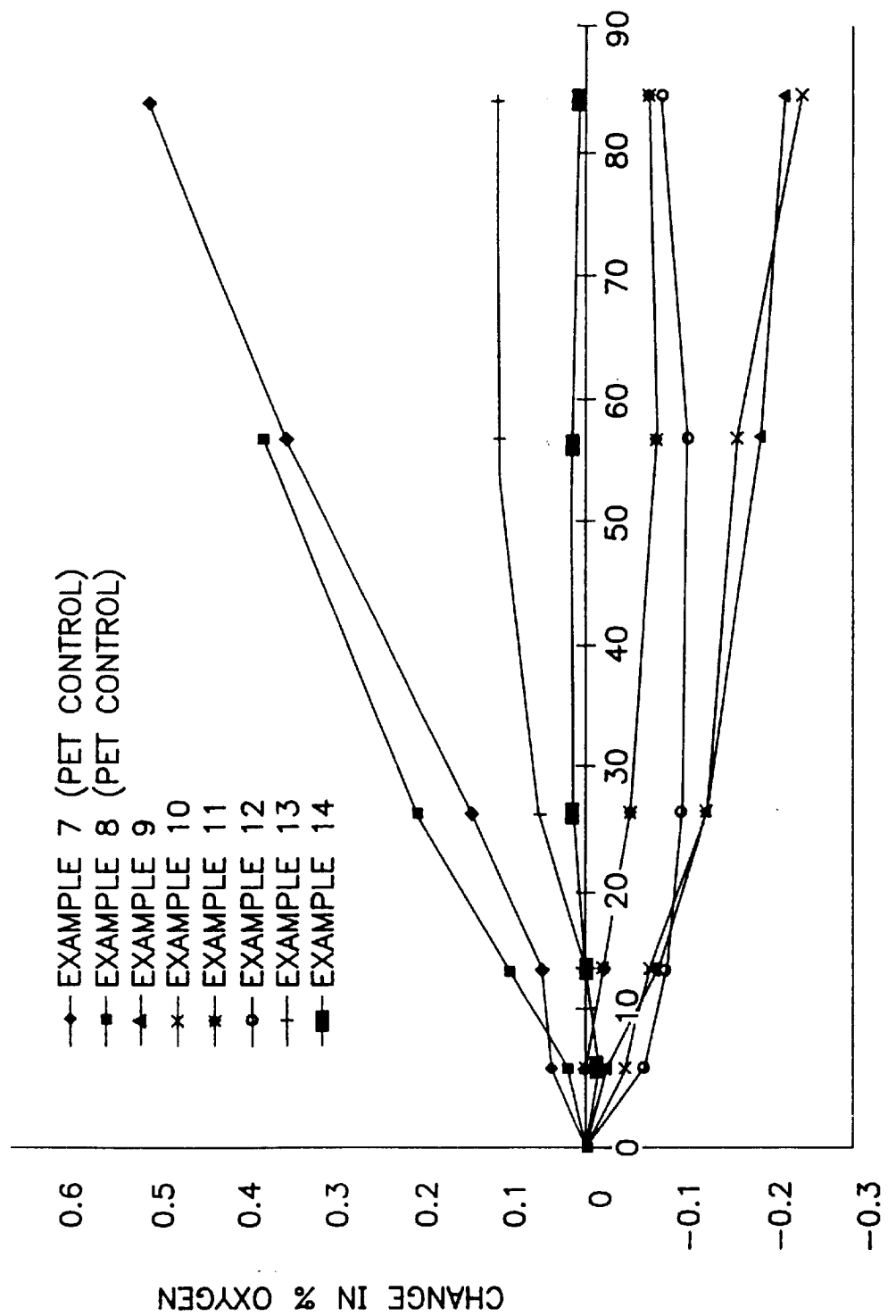
FIG. 5 shows a graph with data which confirms the ability of the copolyesters to consume head space oxygen even when used as the B Layer in an A/B/A or A/B/C bottle wall construction.
Figure 6:
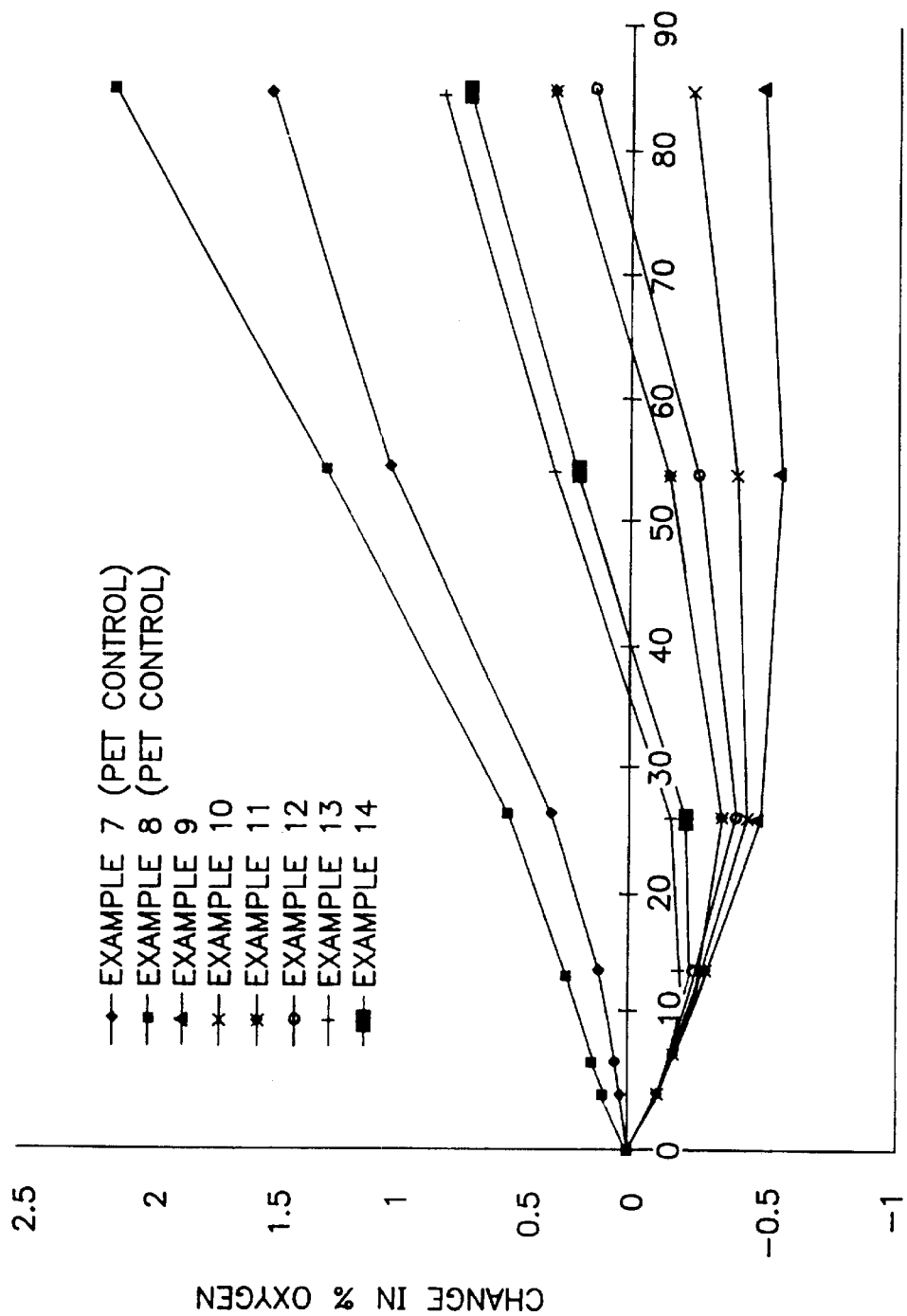
FIG. 6 shows a graph with data similar to that of FIG. 5 and further shows the ability of oxygen scavenging copolyesters to deplete head space oxygen even when used as the B Layer in an A/B/A or A/B/C bottle wall construction.

The data for Examples 7–14 are depicted graphically in FIG. 5 and demonstrate (except for control Examples 7 and 8 which had no scavenging copolyester in the B Layer) that oxygen is consumed from within the bottle cavity. The data of FIG. 5 were taken at 22° C. and 100% relative humidity. The data for Example 7–14 are also depicted graphically in FIG. 6. The data of FIG. 6 were taken at 60° C. and 0% relative humidity. Again the data show that oxygen is consumed from with the bottle cavity by the scavenging copolyester in the B Layer.

Examples 15–18

As previously noted, it was observed that dilution of the scavenging copolyester with a diluent such as PET caused the oxygen scavenging capacity to increase when described on a per unit weight basis of copolyester. The data from Examples 15–18 serve to demonstrate this effect. The copolyester films of Examples 15–18 were all 4 wt % PBD segments with the remainder of the copolymer comprising polyester segments. For all of Examples 15–18, 100 ppm benzophenone and 100 ppm cobalt were also employed. The ppm of benzophenone and cobalt refers to the total weight of the film, i.e., scavenging copolyester plus diluent. The films are further characterized in Table 5 below.

TABLE 5

Scavenging Copolyester Films
Examples 15–18

| Ex. No. | wt % copolyester | wt % diluent | benzophenone ppm | cobalt ppm |
|---|---|---|---|---|
| 15 | 100 | 0 | 100 | 100 |
| 16 | 75 | 25 | 100 | 100 |
| 17 | 50 | 50 | 100 | 100 |
| 18 | 25 | 75 | 100 | 100 |

Figure 7:
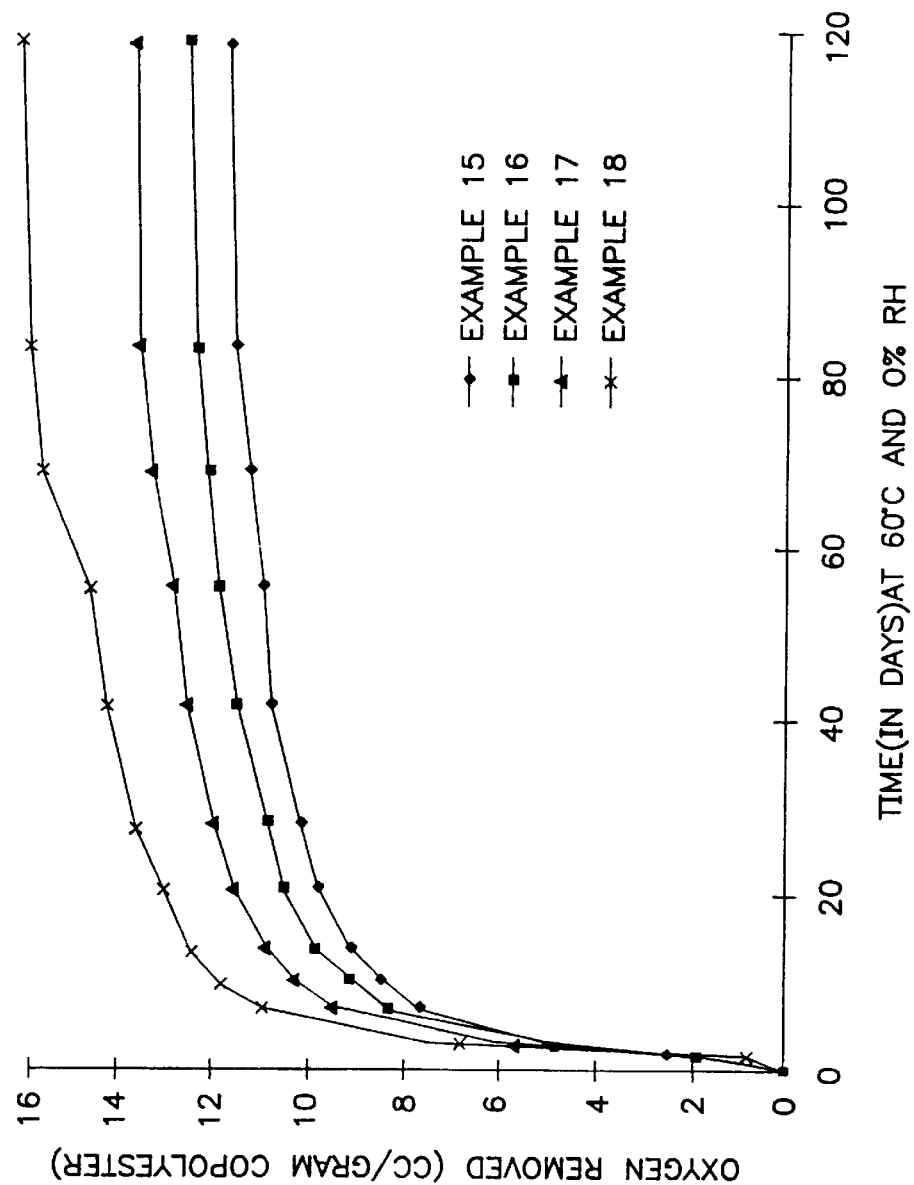
FIG. 7 shows a graph displaying data confirming the increase in oxygen scavenging capacity of the oxygen scavenging copolyesters when used mixed with diluent as the B Layer in an A/B/A or A/B/C bottle wall construction.

The oxygen scavenging capacity of the four films of Examples 15–18 were determined using a method similar to that of Examples 12–15 of U.S. application Ser. No. 08/717, 370 filed Sep. 23, 1996. Film samples of 5 grams were used and a dessicant was placed in each of the 500 cc jars to create and maintain a 0% relative humidity environment. The results are shown graphically in FIG. 7. As is evident from FIG. 7, the scavenging copolyester has a higher oxygen scavenging capacity (in terms of amount scavenged per unit weight of copolyester when used mixed with diluent as the B Layer in an A/B/A bottle wall construction.

The specification and the examples of this invention have largely disclosed processes for fabrication of oxygen scavenging multilayered bottles. Those of ordinary skill in the art will recognize that a great variety of other containers such as cups, bowls, trays, and the like will benefit from the application of this invention and should be considered to be embodied within the scope of the invention. Also, the effectiveness of the scavenging copolyester in 0% relative humidity (see Examples 15–18) shows that it is an effective oxygen scavenger even in a dry environment making it suitable for applications in such an environment, e.g., for packaging of oxygen sensitive electronic components.

We claim:

1. A substantially zero oxygen permeation thermoplastic container for storage of a comestible product having a volume in the range of about 0.03–4 liters and a multilayered wall of total thickness in the range of about 0.1–2 millimeters.

2. The container of claim 1 wherein said container permits no more than 1 ppm, with respect to the product weight, of outside atmospheric oxygen to permeate into the product for a time period in the range of about 30–365 days under ambient storage conditions in a temperature range of about 4–25° C. and wherein said time period is measured from the time at which the container is filled and sealed.

3. The container of claim 2 wherein the time period is in the range of about 60–365 days.

4. The container of claim 2 wherein the time period is in the range of about 60–180 days.

5. The container of claim 1 wherein the container is a bottle.

6. The bottle of claim 5 wherein at least one layer of the multilayered wall is comprised of PET.

7. The bottle of claim 6 wherein the multilayered bottle wall has a clarity equal to at least 70% the clarity of a monolithic PET bottle wall of similar total wall thickness.

8. The container of claim 1 wherein the container further comprises a base wherein said base may optionally be thicker than the wall and optionally of a monolithic construction.

9. The container of claim 1 wherein the container further comprises a section for attachment of a sealing means wherein said container section may optionally be thicker than the wall and optionally of a monolithic construction.

* * * * *

UNITED STATES PATENT AND TRADEMARK OFFICE
CERTIFICATE OF CORRECTION

PATENT NO. : 6,558,762 B2
DATED : May 6, 2003
INVENTOR(S) : Paul J. Cahill, George E. Rotter and Stephen Y. Chen It is certified that error appears in the above-identified patent and that said Letters Patent is hereby corrected as shown below:

Column 1,
Lines 9-10, insert -- 09/254,138 was originally PCT filed on -- in place of "09/254,138 was originally POT filed on"

Column 4,
Line 27, insert -- requirements may be totally different. -- in place of "requirements may De totally different."

Column 10,
Lines 25-26, insert -- centered in the bottle wall between -- in place of "centered in the bottle wail between"

Signed and Sealed this

Fourteenth Day of October, 2003

JAMES E. ROGAN
*Director of the United States Patent and Trademark Office*